United States Patent
Jung et al.

(10) Patent No.: US 10,587,207 B2
(45) Date of Patent: Mar. 10, 2020

(54) TRIBOELECTRIC GENERATOR USING SURFACE PLASMON RESONANCE

(71) Applicant: Samsung Electronics Co., Ltd., Suwon-si, Gyeonggi-do (KR)

(72) Inventors: Alum Jung, Suwon-si (KR); Hyeonjin Shin, Suwon-si (KR); Jae-Young Kim, Suwon-si (KR); Kyung-Eun Byun, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 439 days.

(21) Appl. No.: 15/412,557

(22) Filed: Jan. 23, 2017

(65) Prior Publication Data
US 2018/0062543 A1 Mar. 1, 2018

(30) Foreign Application Priority Data
Aug. 23, 2016 (KR) .................. 10-2016-0106978

(51) Int. Cl.
*H02N 1/04* (2006.01)
(52) U.S. Cl.
CPC .................. *H02N 1/04* (2013.01)
(58) Field of Classification Search
CPC ............... H02N 1/04; Y02B 10/70
USPC ............... 310/309, 300, 308, 310
See application file for complete search history.

(56) References Cited

U.S. PATENT DOCUMENTS

| | | | |
|---|---|---|---|
| 2013/0049531 A1 | 2/2013 | Wang et al. | |
| 2014/0313141 A1* | 10/2014 | Park | G06F 1/1635 345/173 |
| 2014/0338458 A1* | 11/2014 | Wang | G01L 1/005 73/658 |
| 2016/0035449 A1* | 2/2016 | Putterman | H05H 15/00 376/108 |
| 2016/0079318 A1* | 3/2016 | Kim | H01L 27/3225 315/33 |

(Continued)

FOREIGN PATENT DOCUMENTS

| | | |
|---|---|---|
| JP | 2011108722 A | 6/2011 |
| KR | 20120107403 A | 10/2012 |

(Continued)

OTHER PUBLICATIONS

Extended Search Report dated Nov. 14, 2017 in European Application No. 17163641.8.

(Continued)

*Primary Examiner* — Quyen P Leung
*Assistant Examiner* — Eric Johnson
(74) *Attorney, Agent, or Firm* — Harness, Dickey & Pierce, P.L.C.

(57) ABSTRACT

Disclosed are triboelectric generators using surface plasmon resonance. A triboelectric generator includes first and second electrodes spaced apart from each other, first and second electrification layers provided on the first and second electrodes, respectively, and a light source provided to irradiate light onto the second electrification layer. Herein, the second electrification layer includes a metallic material configured to generate surface plasmon resonance due to light of a desired wavelength, and the light source irradiates the light of the desired wavelength configured to generate the surface plasmon resonance, onto the second electrification layer.

20 Claims, 16 Drawing Sheets

(56) References Cited

U.S. PATENT DOCUMENTS

2017/0331397 A1* 11/2017 Kim ................. H02N 1/04

FOREIGN PATENT DOCUMENTS

| KR | 20130050166 A | 5/2013 |
| KR | 101535472 B1 | 7/2015 |
| KR | 20150117869 A | 10/2015 |
| KR | 20150145994 A | 12/2015 |
| WO | WO-13151590 A2 | 10/2013 |

OTHER PUBLICATIONS

Lin, Zong-Hong et al., "A Self-Powered Triboelectric Nanosensor for Mercury Ion Detection," Angewandte Chemie International Edition, vol. 52, 2013, pp. 5065-5069.

Wang, Zhong Lin et al., "Progress in triboelectric nanogenerators as a new energy technology and self-powered sensors," Energy & Environmental Science, vol. 8, 2015, pp. 2250-2282.

Guerrini, Luca et al., "Molecularly-mediated assemblies of plasmonic nanoparticles for Surface-Enhanced Raman Spectroscopy applications," Chem. Soc. Rev., vol. 41, 2012, pp. 7085-7107.

Su, Yen-Hsun et al., "Surface plasmon resonance of layer-by-layer gold nanoparticles induced photoelectric current in environmentally-friendly plasmon-sensitized solar cell," Light: Science & Applications, vol. 1, 2012, pp. 1-5.

Manjavacas, Alejandro et al., "Plasmon-Induced Hot Carriers in Metallic Nanoparticles," ACS NANO, vol. 8, No. 8, 2014, pp. 7630-7638.

Fan, Feng-Ru et al., "Flexible triboelectric generator!" Nano Energy, vol. 1, 2012, pp. 328-334.

Wang, Sihong et al., "Nanoscale Triboelectric-Effect-Enabled Energy Conversion for Sustainably Powering Portable Electronics," Nano Letters, vol. 12, 2012, pp. 6339-6346.

Lin, Long et al., "Segmentally Structured Disk Triboelectric Nanogenerator for Harvesting Rotational Mechanical Energy," Nano Letters, vol. 13, 2013, pp. 2916-2923.

Bai, Peng et al., "Integrated Multilayer Triboelectric Nanogenerator for Harvesting Biomechanical Energy from Human Motions," ACS NANO, vol. 7, No. 4, 2013, pp. 3713-3719.

Lee, Keun Young et al., "Hydrophobic Sponge Structure-Based Triboelectric Nanogenerator," Advanced Materials, vol. 26, 2014, pp. 5037-5042.

Zhu, Guang et al., "Radial-arrayed rotary electrification for high performance triboelectric generator," Nature Communications, 2014, pp. 1-9.

Zhu, Guang et al., "A Shape-Adaptive Thin-Film-Based Approach for 50% High-Efficiency Energy Generation Through Micro-Grating Sliding Electrification," Advanced Materials, vol. 26, 2014, pp. 3788-3796.

* cited by examiner

TRIBOELECTRIC GENERATOR USING SURFACE PLASMON RESONANCE

CROSS-REFERENCE TO RELATED APPLICATION

This application claims the benefit of priority from Korean Patent Application No. 10-2016-0106978, filed on Aug. 23, 2016, in the Korean Intellectual Property Office, the disclosure of which is incorporated herein in its entirety by reference.

BACKGROUND

1. Field

Example embodiments relate to triboelectric generators, and/or to triboelectric generators using surface plasmon resonance.

2. Description of the Related Art

Energy harvesting technology is currently prominent. Energy harvesting devices are regarded as novel environment-friendly energy generating devices configured to transform mechanical energy generated from wind or vibration in nature, people's motion, or the like, into electrical energy.

A triboelectric generator is an energy harvesting device for generating electrical energy by using motion of charges occurring due to friction of two electrification objects. The triboelectric generator typically has a high energy transformation efficiency and thus may achieve a high output by using a small external force. In addition, the triboelectric generator does not have temporal and spatial restrictions compared to energy harvesting devices using heat or sunlight, and may continuously generate electrical energy compared to energy harvesting devices using a piezoelectric material for generating electrical energy based on transformation of a material.

SUMMARY

Example embodiments relate to triboelectric generators using surface plasmon resonance.

Additional example embodiments will be set forth in part in the description which follows and, in part, will be apparent from the description, or may be learned by practice of the example embodiments.

According to an example embodiment, a triboelectric generator includes first and second electrodes spaced apart from each other, a first electrification layer provided on a surface of the first electrode facing the second electrode, and including a dielectric material, a second electrification layer provided on a surface of the second electrode facing the first electrode, electrified with charges of an opposite polarity compared to the first electrification layer due to contact with the first electrification layer, and including a metallic material configured to generate surface plasmon resonance due to light of a desired, or alternatively predetermined wavelength, and a light source provided to irradiate the light of the desired, or alternatively predetermined wavelength configured to generate the surface plasmon resonance, onto the second electrification layer.

The first and second electrification layers may contact each other due to pressing, sliding, or rotating.

The first and second electrodes may include at least one selected from graphene, carbon nanotubes (CNT), indium tin oxide (ITO), metal, and conductive polymer. At least one of the first and second electrodes may include a material configured to transmit, the light of the desired, or alternatively predetermined wavelength configured to generate the surface plasmon resonance.

The first and second electrodes may be provided on first and second substrates, respectively.

The first and second substrates may include a material having sufficient flexibility to be transformed, or elastically deformed, due to an external force, and having a restoring force to return to an original state thereof when the external force is removed. The first substrate may have a convex shape in a first direction, and the second substrate may have a convex shape in a second direction opposite to the first direction.

The first electrification layer may include a material configured to be electrified with positive charges due to contact with the second electrification layer. The first electrification layer may include a material configured to be electrified with negative charges due to contact with the second electrification layer.

The second electrification layer may include a plurality of metal particles configured to generate the surface plasmon resonance. The second electrification layer may further include a plurality of first dielectric bodies provided to surround the metal particles, and some of the metal particles to contact the first electrification layer may expose surfaces thereof to an external environment. The second electrification layer may further include a second dielectric body provided to fill spaces between the first dielectric bodies.

The second electrification layer may include a metal having a surface roughness that is configured to generate the surface plasmon resonance.

At least one of the first and second electrification layers may be doped with a dopant to control electrification characteristics thereof. The second electrode and the second electrification layer may be integrated with each other.

The triboelectric generator may further include an elastic supporting member provided between the first and second electrification layers.

Each of, or at least one of, the first and second electrification layers may include a wing shape, and the first and second electrification layers may contact each other by rotating at least one of the first and second electrification layers.

According to an example embodiment, a triboelectric generator includes a plurality of substrates connected to each other and provided to be foldable at connected parts thereof, first and second electrodes provided on first and second surfaces of the substrates, respectively, first electrification layers provided on the first electrodes and including a dielectric material, second electrification layers provided on the second electrodes, electrified with charges of an opposite polarity compared to the first electrification layers due to contact with the first electrification layers, and including a metallic material configured to generate surface plasmon resonance due to light of a desired, or alternatively predetermined wavelength, and a light source provided to irradiate the light of the desired, or alternatively predetermined wavelength configured to generate the surface plasmon resonance, onto the second electrification layers.

BRIEF DESCRIPTION OF THE DRAWINGS

These and/or other example embodiments will become apparent and more readily appreciated from the following description of the embodiments, taken in conjunction with the accompanying drawings in which.

DETAILED DESCRIPTION

Figure 1:
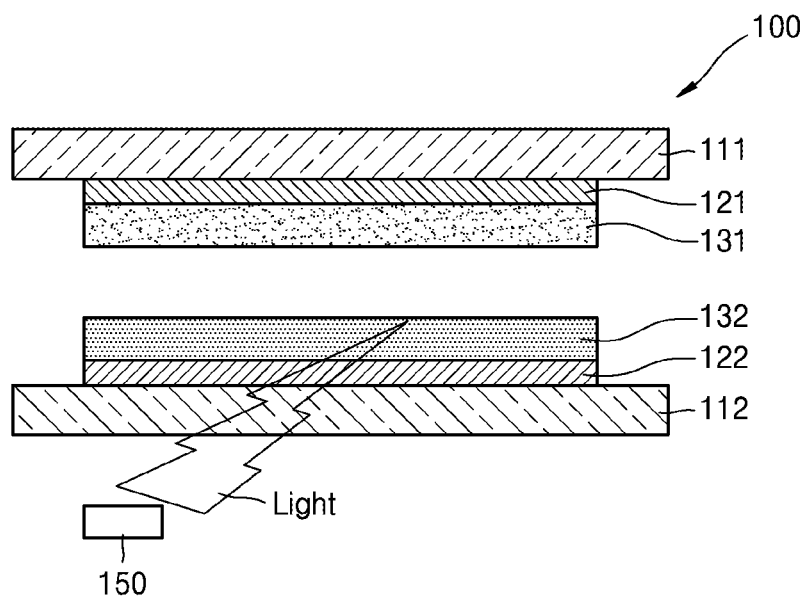
FIG. 1 is a cross-sectional view of a triboelectric generator according to an example embodiment.

Reference will now be made in detail to example embodiments illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures. Expressions such as "at least one of," when preceding a list of elements, modify the entire list of elements and do not modify the individual elements of the list.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

When the terms "about" or "substantially" are used in this specification in connection with a numerical value, it is intended that the associated numerical value include a tolerance of ±10% around the stated numerical value. Moreover, when reference is made to percentages in this specification, it is intended that those percentages are based on weight, i.e., weight percentages. The expression "up to" includes amounts of zero to the expressed upper limit and all values therebetween. When ranges are specified, the range includes all values therebetween such as increments of 0.1%. Moreover, when the words "generally" and "substantially" are used in connection with geometric shapes, it is intended that precision of the geometric shape is not required but that latitude for the shape is within the scope of the disclosure. Although the tubular elements of the embodiments may be cylindrical, other tubular cross-sectional forms are contemplated, such as square, rectangular, oval, triangular and others.

FIG. 1 is a cross-sectional view of a triboelectric generator 100 according to an example embodiment. In general, a triboelectric generator refers to an energy harvesting device for generating electrical energy by using motion of charges occurring due to friction of two electrification objects. FIG. 1 illustrates a pressing-contact-mode triboelectric generator for generating electrical energy by electrifying two electrification objects due to contact therebetween based on pressing.

Referring to FIG. 1, the triboelectric generator 100 includes first and second electrodes 121 and 122 spaced apart from each other, a first electrification layer 131 provided on a surface of the first electrode 121, a second electrification layer 132 provided on a surface of the second electrode 122, and a light source 150 provided to irradiate light of a desired, or alternatively predetermined wavelength onto the second electrification layer 132.

The first and second electrodes 121 and 122 may be provided on first and second substrates 111 and 112, respectively. The first and second substrates 111 and 112 are spaced apart from each other by a certain distance. In FIG. 1, the first substrate 111 may be an upper substrate, and the second substrate 112 may be a lower substrate.

The first and second substrates 111 and 112 may include a hard material, e.g., silicon wafers or glass. However, the first and second substrates 111 and 112 are not limited thereto and may include a variety of materials. For example, the first and second substrates 111 and 112 may include a flexible material such as polyester (PE), polyethersulfone (PES), polyethylene naphthalate (PEN), or Kapton.

The first electrode 121 is provided on a bottom surface of the first substrate 111, and the second electrode 122 is provided on a top surface of the second substrate 112. The first and second electrodes 121 and 122 may include a material having a good electrical conductivity. For example, the first and second electrodes 121 and 122 may include at least one material selected from graphene, carbon nanotubes (CNT), indium tin oxide (ITO), metal, and conductive polymer. Herein, the metal may include at least one selected from, for example, silver (Ag), aluminum (Al), copper (Cu), gold (Au), nickel (Ni), chromium (Cr), and platinum (Pt), but is not limited thereto. Each of, or at least one of, the first and second electrodes 121 and 122 may have a monolayer structure or a multilayer structure.

The light source 150 provided to irradiate the light of the desired, or alternatively predetermined wavelength is located below the second substrate 112 and, in this case, the second substrate 112 and the second electrode 122 may include transparent materials. Accordingly, the light of the desired, or alternatively predetermined wavelength emitted from the light source 150 may be irradiated onto the second electrification layer 132 through the second substrate 112 and the second electrode 122. The light source 150 may be provided at various locations, and the first substrate 111 and the first electrode 121 may include transparent materials depending on the location of the light source 150.

The first electrification layer 131 is provided on a bottom surface of the first electrode 121 facing the second electrode 122. The first electrification layer 131 may include a dielectric material configured to be electrified with charges of a desired, or alternatively predetermined polarity due to contact with the second electrification layer 132, and having a lower electrical conductivity compared to the second electrification layer 132.

The first electrification layer 131 may be electrified with positive charges due to contact with the second electrification layer 132. In this case, the first electrification layer 131 may include, for example, polyformaldehyde, ethylcellulose, polyamide, melamine formol, wool, silk, mica, or nylon. However, the first electrification layer 131 is not limited thereto and may include a variety of materials configured to be electrified with positive charges due to contact with the second electrification layer 132.

Alternatively, the first electrification layer 131 may be electrified with negative charges due to contact with the second electrification layer 132. In this case, the first electrification layer 131 may include, for example, polytetrafluoroethylene (Teflon), polydimethylsiloxane (PDMS), polyvinyl chloride (PVC), polyimide (Kapton), polypropylene (PP), polyethylene (PE), or polystyrene (PS). However, the first electrification layer 131 is not limited thereto.

The second electrification layer 132 is provided on a top surface of the second electrode 122 facing the first electrode 121. Herein, the second electrification layer 132 is provided to be spaced apart from the first electrification layer 131 when an external force is not applied to the triboelectric generator 100. The second electrification layer 132 may be electrified with charges of an opposite polarity compared to the first electrification layer 131 due to contact with the first electrification layer 131. Specifically, when the first electrification layer 131 is electrified with positive charges due to contact with the second electrification layer 132, the second electrification layer 132 may be electrified with negative charges. Alternatively, when the first electrification layer 131 is electrified with negative charges due to contact with the second electrification layer 132, the second electrification layer 132 may be electrified with positive charges.

The second electrification layer 132 may include a metallic material having a higher electrical conductivity compared to the first electrification layer 131 and configured to generate surface plasmon resonance due to the light of the desired, or alternatively predetermined wavelength emitted from the light source 150. Herein, surface plasmon resonance refers to collective oscillation of free electrons on the surface of a metallic material due to resonance with a certain electromagnetic field of energy of light which is incident between the surface of the metallic material and a dielectric body (e.g., air). The metallic material may include a material configured to readily emit electrons due to an external stimulus and having a negative dielectric constant. For example, the metallic material may include at least one selected from Au, Ag, Cu, Al, and steel. However, the second electrification layer 132 is not limited thereto and may include a variety of metallic materials configured to be electrified with charges of an opposite polarity compared to the first electrification layer 131 due to contact with the first electrification layer 131, to generate surface plasmon resonance.

Figure 2:
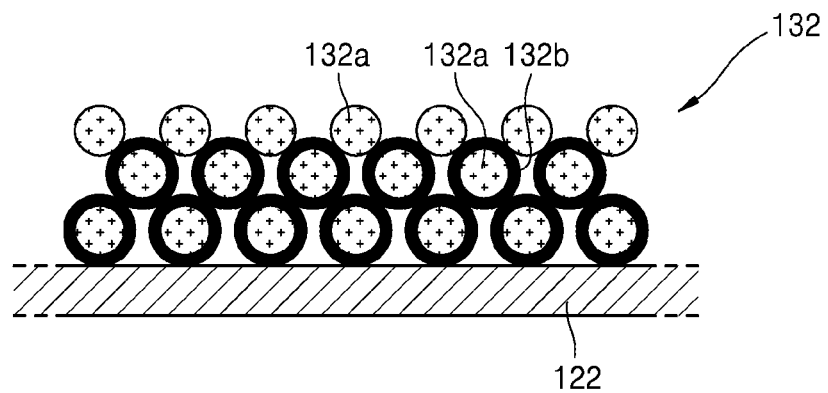
FIG. 2 is a magnified view of a second electrification layer of the triboelectric generator illustrated in FIG. 1.

FIG. 2 is a magnified view of the second electrification layer 132 of the triboelectric generator 100 illustrated in FIG. 1. Referring to FIG. 2, the second electrification layer 132 is provided on the top surface of the second electrode 122. The second electrification layer 132 may include a plurality of metal particles 132a, and a plurality of dielectric bodies 132b provided to surround the metal particles 132a. Herein, the metal particles 132a may have a monolayer structure or a multilayer structure and are insulated from the second electrode 122 by the dielectric bodies 132b. Some of the metal particles 132a to contact the first electrification layer 131 expose surfaces thereof to an external environment. When the light of the desired, or alternatively predetermined wavelength is irradiated onto the exposed surfaces of the metal particles 132a, surface plasmon resonance may be generated. The metal particles 132a may include at least one selected from, for example, Au, Ag, Cu, Al, and steel.

At least one of the first and second electrification layers 131 and 132 may be doped with a p-type dopant or an n-type dopant to control electrification characteristics on the surface thereof. A source of the p-type dopant may include, for example, an ionic liquid such as $NO_2BF_4$, $NOBF_4$, or $NO_2SbF_6$, an acidic compound such as HCl, $H_3PO_4$, $CH_3COOH$, $H_2SO_4$, or $HNO_3$, or an organic compound such as dichlorodicyanoquinone (DDQ), Oxone, dimyristoylphosphatidylinositol (DMPI), or trifluoromethanesulfonimide. Otherwise, the source of the p-type dopant may include $HPtCl_4$, $AuCl_3$, $HAuCl_4$, silver trifluoromethanesulfonate (AgOTf), $AgNO_3$, $H_2PdCl_6$, $Pd(OAc)_2$, or $Cu(CN)_2$.

A source of the n-type dopant may include, for example, a reduction product of a substituted or unsubstituted nicotinamide, a reduction product of a compound which is chemically bound to a substituted or unsubstituted nicotinamide, or a compound comprising at least two pyridinium moieties in which a nitrogen atom of at least one of the pyridinium moieties is reduced. For example, the source of the n-type dopant may include nicotinamide mononucleotide-H (NMNH), nicotinamide adenine dinucleotide-H (NADH), nicotinamide adenine dinucleotide phosphate-H (NADPH), or viologen. Otherwise, the source of the n-type dopant may include polymer such as polyethylenimine (PEI). Alternatively, the n-type dopant may include alkali metal such as potassium (K) or lithium (Li). The above-mentioned materials of the p-type dopant and the n-type dopant are merely examples, and a variety of other materials may be used as the dopants.

The light source 150 irradiates the light of the desired, or alternatively predetermined wavelength configured to generate surface plasmon resonance, onto the surfaces of the metal particles 132a of the second electrification layer 132. FIG. 1 illustrates a case in which the light source 150 is provided below the second substrate 112 and being configured to be a lower substrate. In this case, the second substrate 112 and the second electrode 122 may include transparent materials to allow the light emitted from the light source 150, to reach the second electrification layer 132. The location of the light source 150 may be variously changed, and the first substrate 111 and the first electrode 121 may include transparent materials depending on the location of the light source 150. A surface plasmon resonance effect generated due to the light emitted from the light source 150 and irradiated onto the metal particles 132a of the second electrification layer 132 may be controlled based on, for example, the material, size, shape, or density of the metal particles 132a included in the second electrification layer 132, or the wavelength, intensity, or incidence angle of the light irradiated onto the metal particles 132a.

Figure 3A:
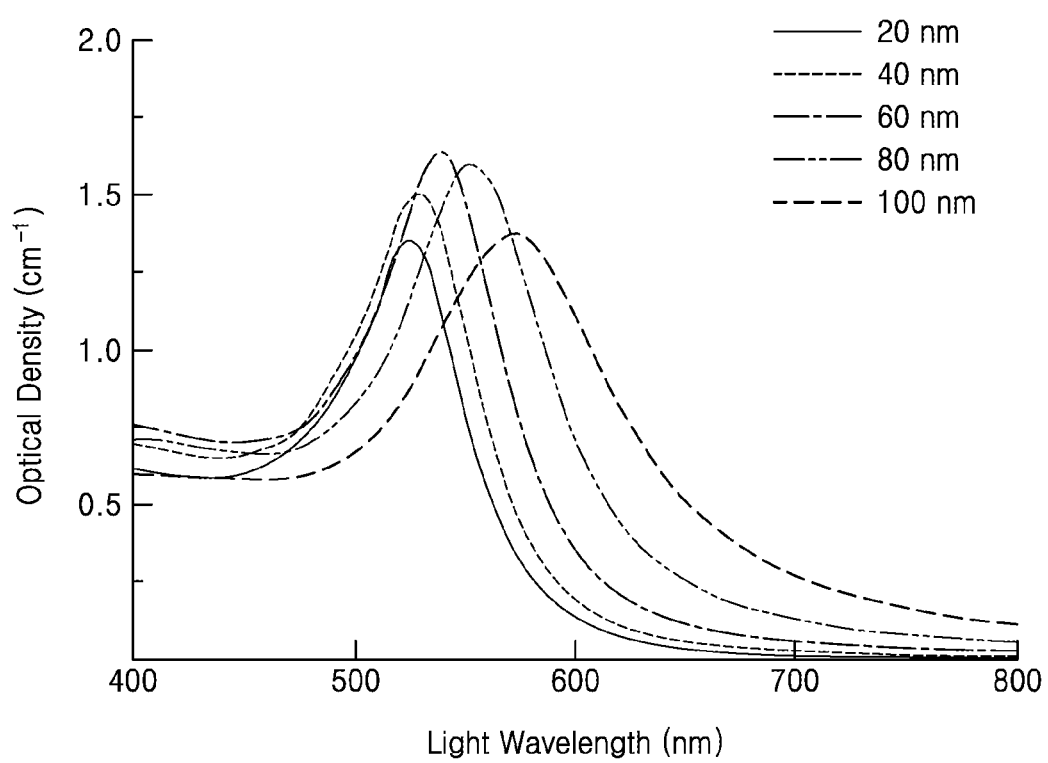
FIG. 3A is a graph showing the wavelength of light configured to generate surface plasmon resonance based on the size of gold (Au) nanoparticles.
Figure 3B:
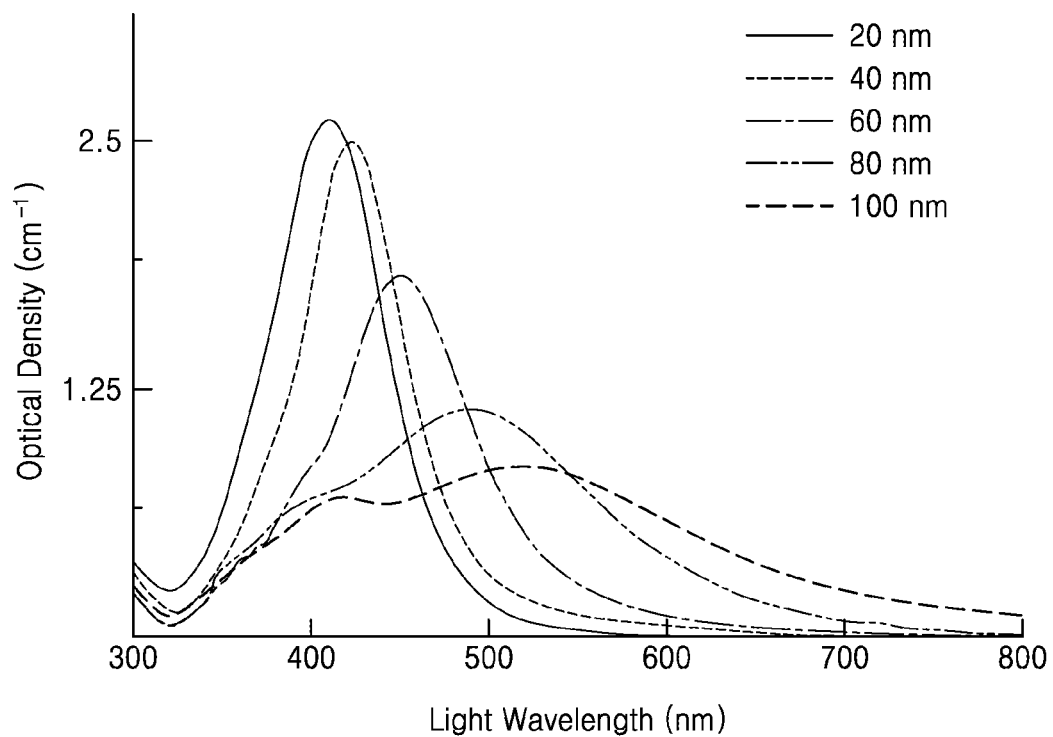
FIG. 3B is a graph showing the wavelength of light configured to generate surface plasmon resonance based on the size of silver (Ag) nanoparticles.

FIGS. 3A and 3B are graphs showing the wavelength of light configured to generate a surface plasmon resonance effect based on the size of the metal particles 132a. Specifically, FIG. 3A is a graph showing the wavelength of the light configured to generate the surface plasmon resonance effect based on the size of gold (Au) nanoparticles, and FIG. 3B is a graph showing the wavelength of the light configured to generate the surface plasmon resonance effect based on the size of silver (Ag) nanoparticles.

Referring to FIG. 3A, when the size of the Au nanoparticles is about 20 nm to about 100 nm, the wavelength of the light configured to generate the surface plasmon resonance effect is about 500 nm to about 600 nm and is increased in proportion to the size of the Au nanoparticles. Referring to FIG. 3B, when the size of the Ag nanoparticles is about 20 nm to about 100 nm, the wavelength of the light configured to generate the surface plasmon resonance effect is about 400 nm to about 520 nm and is increased in proportion to the size of the Ag nanoparticles.

As such, the wavelength of the light configured to generate the surface plasmon resonance effect may vary based on the material and size of the metal particles 132a of the second electrification layer 132. Accordingly, the surface plasmon resonance effect may be controlled by the material and size of the metal particles 132a or the wavelength of light irradiated onto the metal particles 132a.

As described above, since the second electrification layer 132 includes the metal particles 132a configured to generate surface plasmon resonance due to the light of the desired, or alternatively predetermined wavelength, output energy of the triboelectric generator 100 may be increased. Specifically, when the light of the desired, or alternatively predetermined wavelength is irradiated from the light source 150 onto the metal particles 132a of the second electrification layer 132, hot carriers are generated in the metal particles 132a due to surface plasmon resonance and may be easily transferred to a material contacting the metal particles 132a. As such, if the first electrification layer 131 contacts the second electrification layer 132, since the hot carriers (electrons) generated in the metal particles 132a of the second electrification layer 132 are easily transferred to the first electrification layer 131, the intensity of an electric field may be increased and thus output energy generated from the triboelectric generator 100 may also be increased.

FIGS. 4A to 4E are cross-sectional views for describing an electrical energy generating mechanism of the triboelectric generator 100 illustrated in FIG. 1. The following description assumes that the first electrification layer 131 is electrified with negative charges and the second electrification layer 132 is electrified with positive charges when the first and second electrification layers 131 and 132 contact each other.

Figure 4A:
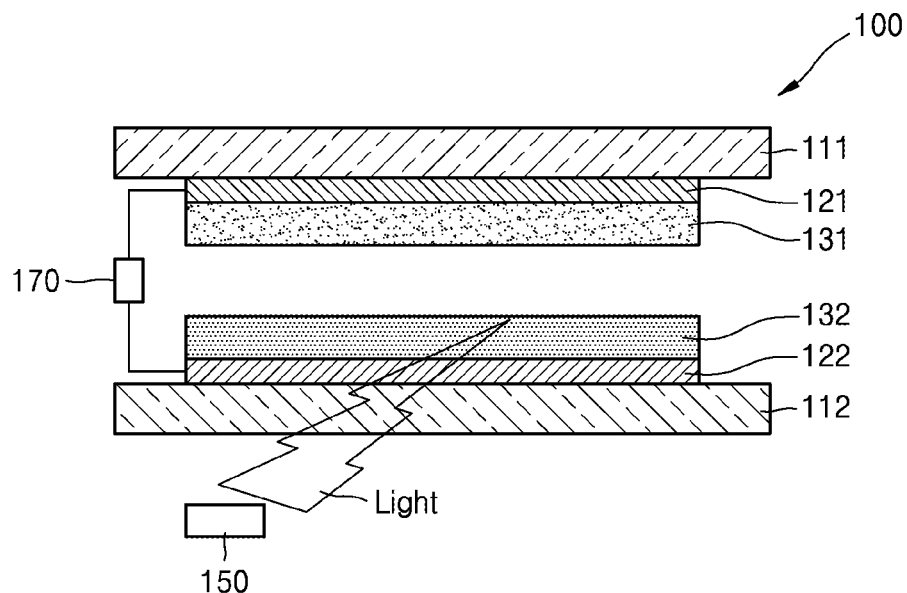
FIGS. 4A to 4E are cross-sectional views for describing an electrical energy generating mechanism of the triboelectric generator illustrated in FIG. 1.

FIG. 4A illustrates a state in which an external force is not applied to the triboelectric generator 100. In FIG. 4A, reference numeral 170 denotes a load for detecting the flow of electrons between the first and second electrodes 121 and 122. Referring to FIG. 4A, when the light of the desired, or alternatively predetermined wavelength emitted from the light source 150 is irradiated onto the second electrification layer 132, hot carriers are generated on the surfaces of the metal particles 132a of the second electrification layer 132 due to surface plasmon resonance.

Figure 4B:
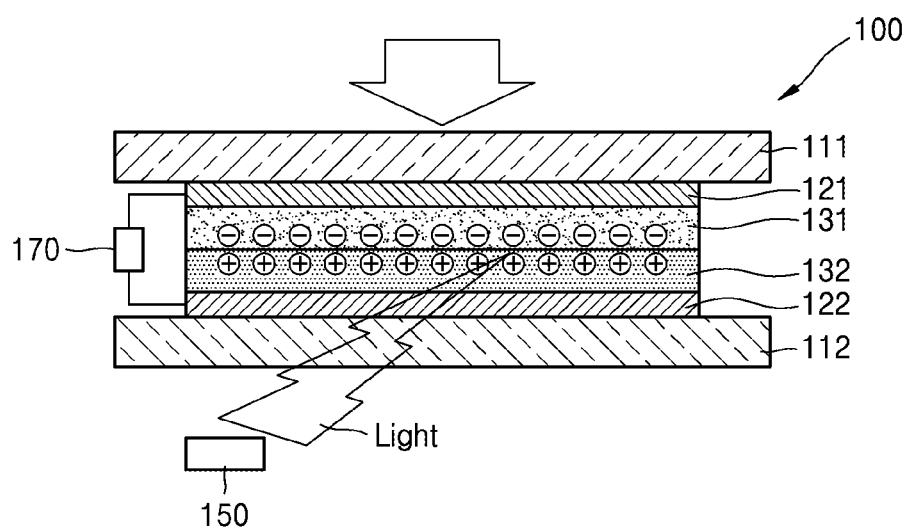

FIG. 4B illustrates a state in which the first and second electrification layers 131 and 132 contact each other due to an external force applied to the triboelectric generator 100. Referring to FIG. 4B, when the light of the desired, or alternatively predetermined wavelength emitted from the light source 150 is irradiated onto the second electrification layer 132, if a pressing force is applied to the first substrate 111, the distance between the first and second electrification layers 131 and 132 is reduced and thus the first and second electrification layers 131 and 132 contact each other. As described above, when the first and second electrification layers 131 and 132 contact each other, a contact surface of the first electrification layer 131 may be electrified with negative charges, and a contact surface of the second electrification layer 132 may be electrified with positive charges. Herein, since hot carriers generated due to surface plasmon resonance move from the metal particles 132a of the second electrification layer 132 to the first electrification layer 131, the contact surfaces of the first and second electrification layers 131 and 132 may be electrified with more charges.

Figure 4C:
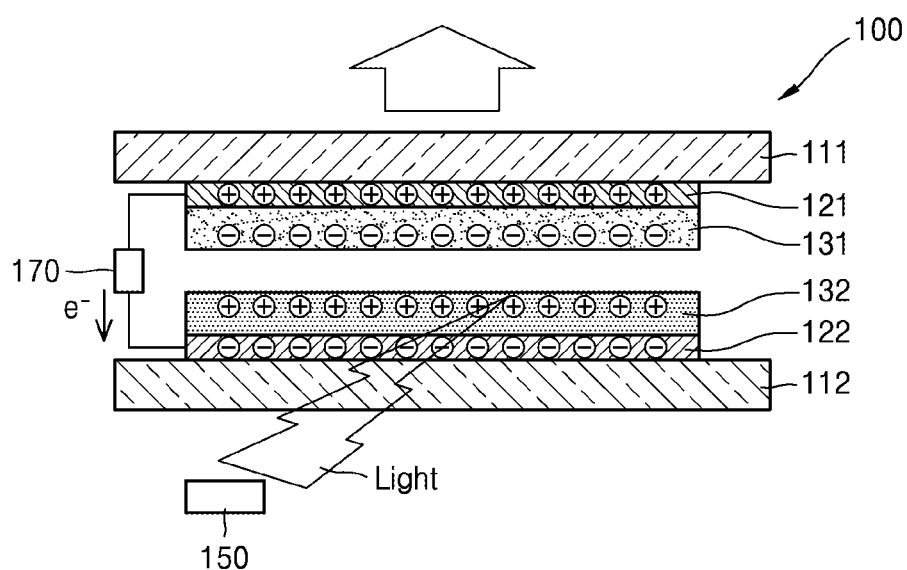

FIG. 4C illustrates a state in which the external force applied to the triboelectric generator 100 is released and thus the first and second electrification layers 131 and 132 is spaced apart from each other. Referring to FIG. 4C, if the pressing force applied to the first substrate 111 is released, the first and second electrification layers 131 and 132 contacting each other start to be spaced apart from each other. When the first and second electrification layers 131 and 132 are spaced apart from each other as described above, positive charges are induced to the first electrode 121 and negative charges are induced to the second electrode 122 for equilibrium of charges. To this end, electrons (e⁻) move from the first electrode 121 to the second electrode 122, and the flow of electrons makes a current flow through the load 170.

Figure 4D:
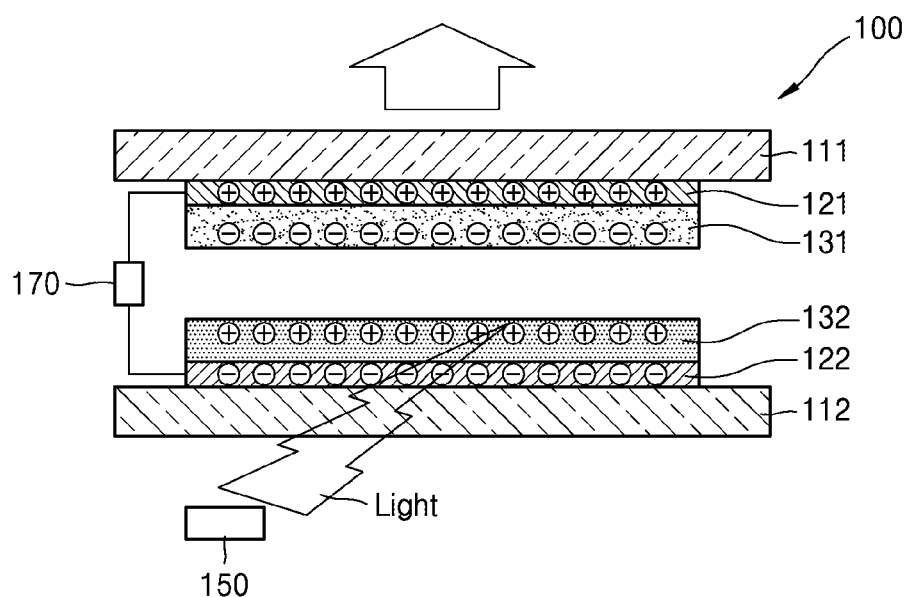

FIG. 4D illustrates that the external force applied to the triboelectric generator 100 is continuously released and thus the first and second electrification layers 131 and 132 are spaced apart from each other to an initial state thereof. Referring to FIG. 4D, if the pressing force applied to the first substrate 111 is continuously released, the distance between the first and second electrification layers 131 and 132 is continuously increased and thus the first and second electrification layers 131 and 132 return to the initial state thereof as illustrated in FIG. 4A.

Figure 4E:
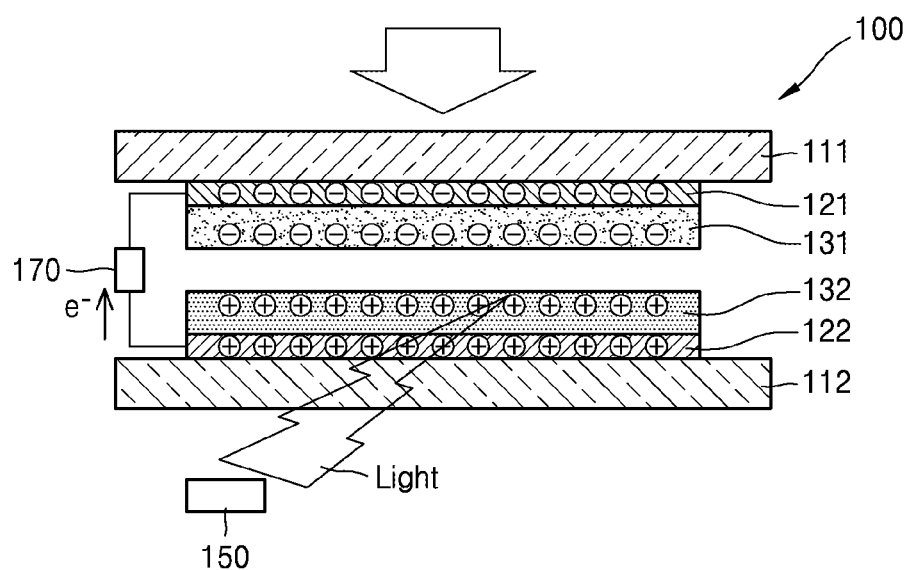

FIG. 4E illustrates that the first and second electrification layers 131 and 132 are spaced apart from each other by a certain distance due to an external force applied to the triboelectric generator 100. Referring to FIG. 4E, if a pressing force is applied to the first substrate 111, the distance between the first and second electrification layers 131 and 132 is reduced and thus the first and second electrification layers 131 and 132 are spaced apart from each other by a certain distance. As described above, when the first and second electrification layers 131 and 132 are spaced apart from each other by a certain distance, due to electrostatic induction, the negative charges of the first electrification layer 131 induce positive charges to the second electrode 122 and the positive charges of the second electrification layer 132 induce negative charges to the first electrode 121. To this end, electrons (e⁻) move from the second electrode 122 to the first electrode 121, and the flow of electrons makes a current flow through the load 170.

As described above, in the triboelectric generator 100 according to the example embodiment, since the second electrification layer 132 includes the metal particles 132a configured to generate surface plasmon resonance due to the light of the desired, or alternatively predetermined wavelength emitted from the light source 150, output energy of the triboelectric generator 100 may be increased.

Figure 5A:
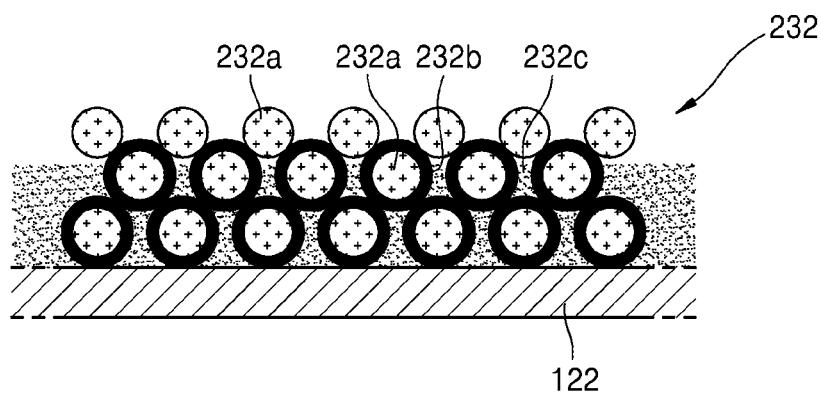
FIGS. 5A to 5C are magnified views of modified examples of the second electrification layer illustrated in FIG. 1.
Figure 5B:
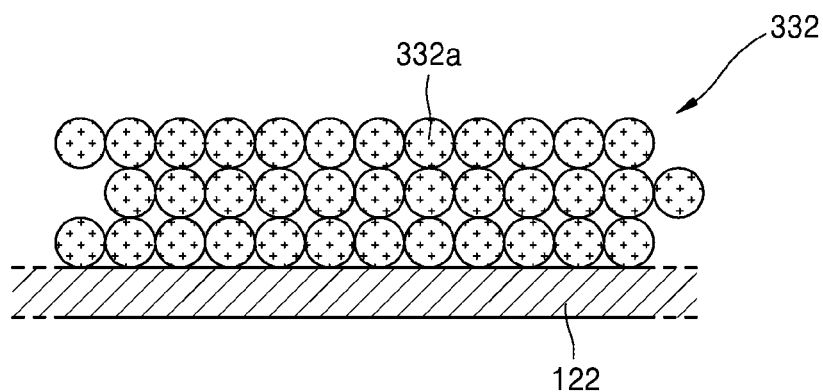
Figure 5C:
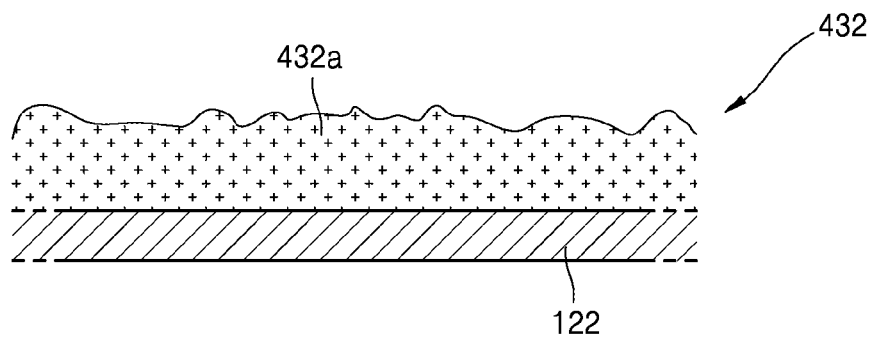

FIGS. 5A to 5C are magnified views of modified example embodiment of the second electrification layer 132 illustrated in FIG. 1.

Referring to FIG. 5A, a second electrification layer 232 may include a plurality of metal particles 232a, a plurality of first dielectric bodies 232b provided to surround the metal particles 232a, and a second dielectric body 232c provided to fill spaces between the first dielectric bodies 232b. Herein, the metal particles 232a may have a monolayer structure or a multilayer structure and are insulated from the second electrode 122 by the first and second dielectric bodies 232b and 232c. Some of the metal particles 232a to contact the first electrification layer 131 expose surfaces thereof to an external environment. When the light of the desired, or alternatively predetermined wavelength is irradiated onto the exposed surfaces of the metal particles 232a, surface plasmon resonance may be generated. The metal particles 232a configured to generate surface plasmon resonance may include at least one selected from, for example, Au, Ag, Cu, Al, and steel.

Referring to FIG. 5B, a second electrification layer 332 may include a plurality of metal particles 332a, and the metal particles 332a may have a monolayer structure or a multilayer structure. Herein, the metal particles 332a may be provided to be electrically connected to the second electrode 122. Some of the metal particles 332a to contact the first electrification layer 131 expose surfaces thereof to an external environment. When the light of the desired, or alternatively predetermined wavelength is irradiated onto the exposed surfaces of the metal particles 332a, surface plasmon resonance may be generated.

Referring to FIG. 5C, a second electrification layer 432 may include a metal 432a having a desired, or alternatively predetermined surface roughness. Herein, the metal 432a may have a surface roughness configured to generate surface plasma resonance due to the light of the desired, or alternatively predetermined wavelength irradiated from the light source 150. The metal 432a may be provided to be electrically connected to the second electrode 122.

Figure 6:
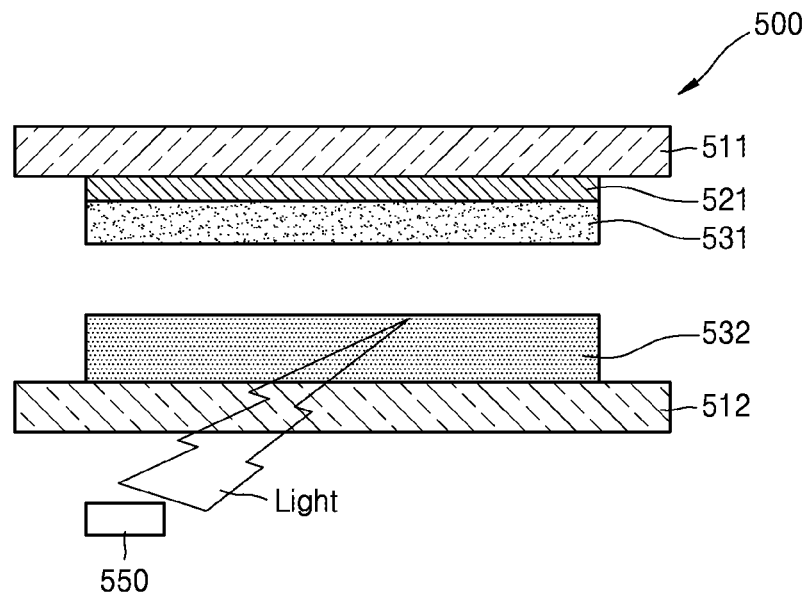
FIG. 6 is a cross-sectional view of a triboelectric generator according to another example embodiment.

FIG. 6 is a cross-sectional view of a triboelectric generator 500 according to another example embodiment. The triboelectric generator 500 illustrated in FIG. 6 may be produced by integrating the second electrode 122 and the second electrification layer 132 of FIG. 1 with each other.

Referring to FIG. 6, the triboelectric generator 500 includes first and second substrates 511 and 512 spaced apart from each other, a first electrode 521 provided on the first substrate 511, a first electrification layer 531 provided on the first electrode 521, a second electrification layer 532 provided on the second substrate 512, and a light source 550 provided to irradiate light of a desired, or alternatively predetermined wavelength onto the second electrification layer 532. In FIG. 6, the first substrate 511 may be an upper substrate, and the second substrate 512 may be a lower substrate. The first and second substrates 511 and 512 may include a hard material or a flexible material.

The first electrode 521 is provided on a bottom surface of the first substrate 511 facing the second substrate 512. The first electrode 521 may include a material having an good electrical conductivity, for example, at least one material selected from graphene, CNT, ITO, metal, and conductive polymer. Herein, the metal may include at least one selected from, for example, Ag, Al, Cu, Au, Ni, Cr, and Pt, but is not limited thereto. The first electrode 521 may have a monolayer structure or a multilayer structure.

The first electrification layer 531 is provided on a bottom surface of the first electrode 521. The first electrification layer 531 may include a dielectric material configured to be electrified with positive charges or negative charges due to contact with the second electrification layer 532, and having a lower electrical conductivity compared to the second electrification layer 532. A detailed description of the material of the first electrification layer 531 is given above and thus is omitted herein.

The second electrification layer 532 is provided on a top surface of the second substrate 512 facing the first substrate 511. The second electrification layer 532 may be electrified with charges of an opposite polarity compared to the first electrification layer 531 due to contact with the first electrification layer 531. Specifically, when the first electrification layer 531 is electrified with positive charges due to contact with the second electrification layer 532, the second electrification layer 532 may be electrified with negative charges. Alternatively, when the first electrification layer 531 is electrified with negative charges due to contact with the second electrification layer 532, the second electrification layer 532 may be electrified with positive charges.

The second electrification layer 532 may include a metallic material having a higher electrical conductivity compared to the first electrification layer 531 and configured to generate surface plasmon resonance due to the light of the desired, or alternatively predetermined wavelength emitted from the light source 550. The metallic material may include a material configured to readily emit electrons due to an external stimulus and having a negative dielectric constant. For example, the metallic material may include at least one selected from Au, Ag, Cu, Al, and steel. However, the second electrification layer 532 is not limited thereto. At least one of the first and second electrification layers 531 and 532 may be doped with a p-type dopant or an n-type dopant to control electrification characteristics on the surface thereof.

In the example embodiment, the second electrification layer 532 is configured to not only be an electrification layer, but also to be an electrode. That is, the second electrification layer 532 may also be configured to be a second electrode corresponding to the first electrode 521. To this end, the second electrification layer 532 may include, for example, a plurality of metal particles configured to generate surface plasmon resonance as illustrated in FIG. 5B or include a metal having a surface roughness configured to generate surface plasmon resonance as illustrated in FIG. 5C.

The light source 550 provided to generate surface plasmon resonance by irradiating the light of the desired, or alternatively predetermined wavelength onto the second electrification layer 532 is located near the second electrification layer 532. The light source 550 may be provided at various locations to irradiate the light of the desired, or alternatively predetermined wavelength onto the second electrification layer 532.

Figure 7:
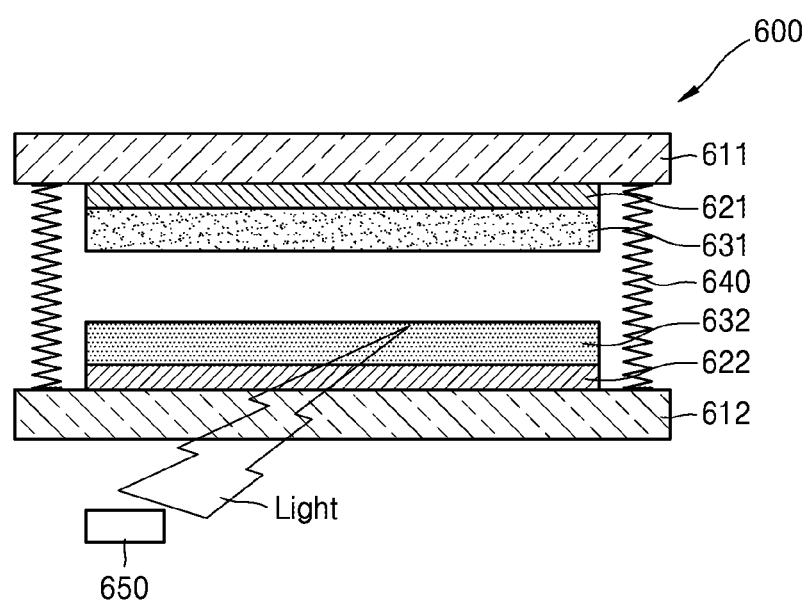
FIG. 7 is a cross-sectional view of a triboelectric generator according to another example embodiment.

FIG. 7 is a cross-sectional view of a triboelectric generator 600 according to another example embodiment. The triboelectric generator 600 illustrated in FIG. 7 may be produced by adding an elastic supporting member between the first and second substrates 111 and 112 of FIG. 1.

Referring to FIG. 7, the triboelectric generator 600 includes first and second electrodes 621 and 622 spaced apart from each other, a first electrification layer 631 provided on a surface of the first electrode 621, a second electrification layer 632 provided on a surface of the second electrode 622, a light source 650 provided to irradiate light of a desired, or alternatively predetermined wavelength onto the second electrification layer 632, and at least one elastic supporting member 640 provided between the first and second electrification layers 631 and 632.

The first and second electrodes 621 and 622 may be provided on first and second substrates 611 and 612, respectively. The first and second substrates 611 and 612 may include a hard material or a flexible material. The first electrode 621 is provided on a bottom surface of the first substrate 611, and the second electrode 622 is provided on a top surface of the second substrate 612. The first and second electrodes 621 and 622 may include a material having a good electrical conductivity, for example, at least one material selected from graphene, CNT, ITO, metal, and conductive polymer.

The light source 650 provided to irradiate the light of the desired, or alternatively predetermined wavelength is located below the second substrate 612, and the second substrate 612 and the second electrode 622 may include transparent materials. The light source 650 may be provided at various locations, and the first substrate 611 and the first electrode 621 may include transparent materials depending on the location of the light source 650.

The first electrification layer 631 is provided on a bottom surface of the first electrode 621 facing the second electrode 622. The first electrification layer 631 may include a dielectric material configured to be electrified with positive charges or negative charges due to contact with the second electrification layer 632, and having a lower electrical conductivity compared to the second electrification layer 632.

The second electrification layer 632 may include a metallic material having a higher electrical conductivity compared to the first electrification layer 631 and configured to generate surface plasmon resonance due to the light of the desired, or alternatively predetermined wavelength emitted from the light source 650. The metallic material may include a material configured to readily emit electrons due to an external stimulus and having a negative dielectric constant. For example, the metallic material may include at least one selected from Au, Ag, Cu, Al, and steel, but is not limited thereto.

The second electrification layer 632 may have, for example, the structure illustrated in FIG. 2, 5A, 5B, or 5C. At least one of the first and second electrification layers 631 and 632 may be doped with a p-type dopant or an n-type dopant to control electrification characteristics on the surface thereof.

The light source 650 irradiates the light of the desired, or alternatively predetermined wavelength configured to generate surface plasmon resonance, onto the surface of the metallic material of the second electrification layer 632. FIG. 7 illustrates a case in which the light source 650 is provided below the second substrate 612 being configured to be a lower substrate, but the location of the light source 650 may be variously changed. A surface plasmon resonance effect generated due to the light emitted from the light source 650 and irradiated onto the metallic material of the second electrification layer 632 may be controlled based on, for example, the material, size, shape, or density of the metallic material included in the second electrification layer 632, or the wavelength, intensity, or incidence angle of the light irradiated onto the metallic material.

The elastic supporting member 640 may be provided between the first and second substrates 611 and 612. The elastic supporting member 640 may include, for example, a spring provided to support the first and second substrates 611 and 612 and to apply an elastic force in a direction in which the first and second substrates 611 and 612 are spaced apart from each other. However, the elastic supporting member 640 is not limited thereto. As described above, if the elastic supporting member 640 is provided between the first and second substrates 611 and 612, when an external force applied to the first substrate 611 is released, the first and second substrates 611 and 612 may be more easily restored to an original state thereof. Although the second electrode 622 and the second electrification layer 632 are individually provided in the above description, the second electrode 622 and the second electrification layer 632 may be integrated with each other.

Figure 8:
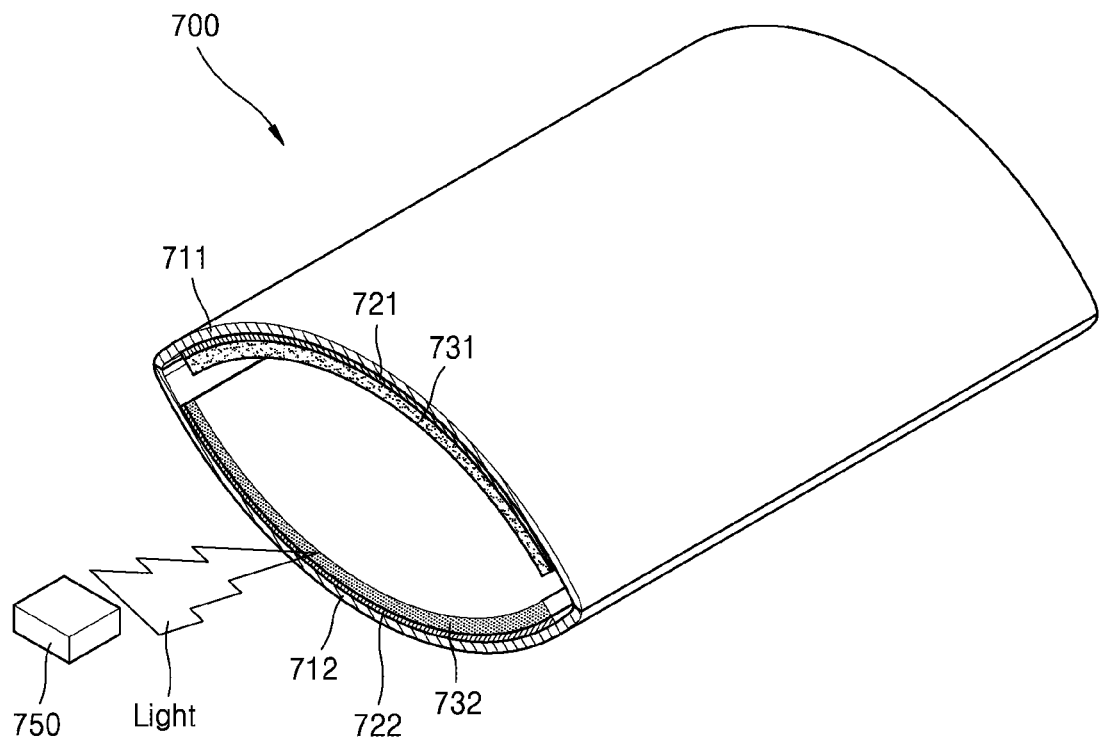
FIG. 8 is a perspective view of a triboelectric generator according to another example embodiment.

FIG. 8 is a perspective view of a triboelectric generator 700 according to another example embodiment.

Referring to FIG. 8, the triboelectric generator 700 includes first and second substrates 711 and 712 spaced apart from each other, first and second electrodes 721 and 722, a first electrification layer 731 provided on a surface of the first electrode 721, a second electrification layer 732 provided on a surface of the second electrode 722, and a light source 750. The triboelectric generator 700 has a physical structure in which the first and second electrification layers 731 and 732 are spaced apart from each other when an external force is not applied to the triboelectric generator 700, and contact each other when an external force is applied to the triboelectric generator 700.

The first and second substrates 711 and 712 may include a material having flexibility to be transformed due to an external force, and having a restoring force to return to an original state thereof when the external force is removed. For example, the first and second substrates 711 and 712 may include polyester (PE), polyethersulfone (PES), polyethylene naphthalate (PEN), or Kapton, but is not limited thereto. For example, in FIG. 8, the first substrate 711 may have a convex shape in an upward direction, and the second substrate 712 may have a convex shape in a downward direction.

The first electrode 721 is provided on a bottom surface of the first substrate 711, and the second electrode 722 is provided on a top surface of the second substrate 712. The first and second electrodes 721 and 722 may have flexibility corresponding to transformation of the first and second substrates 711 and 712. The first and second electrodes 721 and 722 may include a material having a good electrical conductivity. For example, the first and second electrodes 721 and 722 may include at least one material selected from graphene, CNT, ITO, metal, and conductive polymer. Herein, the metal may include at least one selected from, for example, Ag, Al, Cu, Au, Ni, Cr, and Pt, but is not limited thereto. Each of, or at least one of, the first and second electrodes 721 and 722 may have a monolayer structure or a multilayer structure.

The first electrification layer 731 is provided on a bottom surface of the first electrode 721 facing the second electrode 722, and the second electrification layer 732 is provided on a top surface of the second electrode 722 facing the first electrode 721. The first and second electrification layers 731 and 732 may have flexibility corresponding to transformation of the first and second substrates 711 and 712. The first and second electrification layers 731 and 732 may include materials to be electrified with charges of different polarities due to contact therebetween.

The first electrification layer 731 may include a dielectric material configured to be electrified with positive charges or negative charges due to contact with the second electrification layer 732, and having a lower electrical conductivity compared to the second electrification layer 732. When the first electrification layer 731 is electrified with positive charges, the first electrification layer 731 may include, for example, polyformaldehyde, ethylcellulose, polyamide, melamine formol, wool, silk, mica, or nylon. However, the first electrification layer 731 is not limited thereto. Alternatively, when the first electrification layer 731 is electrified with negative charges, the first electrification layer 731 may include, for example, polytetrafluoroethylene (Teflon), polydimethylsiloxane (PDMS), polyvinyl chloride (PVC), polyimide (Kapton), polypropylene (PP), polyethylene (PE), or polystyrene (PS). However, the first electrification layer 731 is not limited thereto.

The second electrification layer 732 may include a metallic material having a higher electrical conductivity compared to the first electrification layer 731 and configured to generate surface plasmon resonance due to light of a desired, or alternatively predetermined wavelength emitted from the light source 750. The metallic material may include a material configured to readily emit electrons due to an external stimulus and having a negative dielectric constant. For example, the metallic material may include at least one selected from Au, Ag, Cu, Al, and steel. However, the second electrification layer 732 is not limited thereto.

The second electrification layer 732 may have, for example, the structure illustrated in FIG. 2, 5A, 5B, or 5C. At least one of the first and second electrification layers 731 and 732 may be doped with a p-type dopant or an n-type dopant to control electrification characteristics on the surface thereof.

The light source 750 irradiates the light of the desired, or alternatively predetermined wavelength configured to generate surface plasmon resonance, onto the surface of the metallic material of the second electrification layer 732. The location of the light source 750 may be variously changed. A surface plasmon resonance effect generated due to the light emitted from the light source 750 and irradiated onto the metallic material of the second electrification layer 732 may be controlled based on, for example, the material, size, shape, or density of the metallic material included in the second electrification layer 732, or the wavelength, intensity, or incidence angle of the light irradiated onto the metallic material. Although the second electrode 722 and the second electrification layer 732 are individually provided in the above description, the second electrode 722 and the second electrification layer 732 may be integrated with each other.

FIGS. 9A to 9E are cross-sectional views for describing operation of the triboelectric generator 700 illustrated in FIG. 8.

Figure 9A:
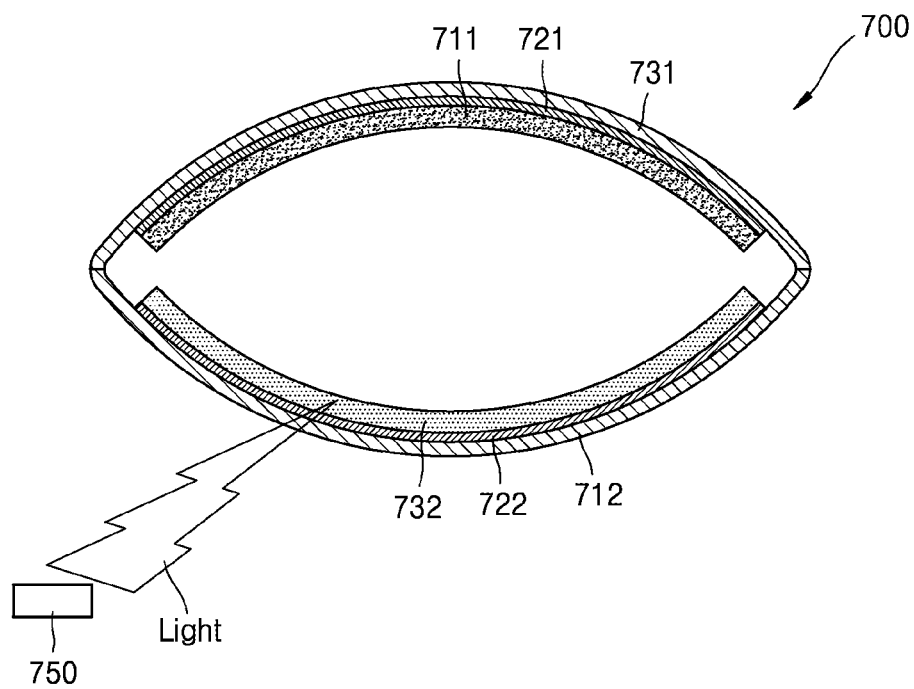
FIGS. 9A to 9E are cross-sectional views for describing operation of the triboelectric generator illustrated in FIG. 8.

FIG. 9A illustrates an initial state before the triboelectric generator 700 is transformed. In the state illustrated in FIG. 9A, if the light source 750 irradiates the light of the desired, or alternatively predetermined wavelength onto the second electrification layer 732, surface plasmon resonance is generated on the surface of the metallic material of the second electrification layer 732.

Figure 9B:
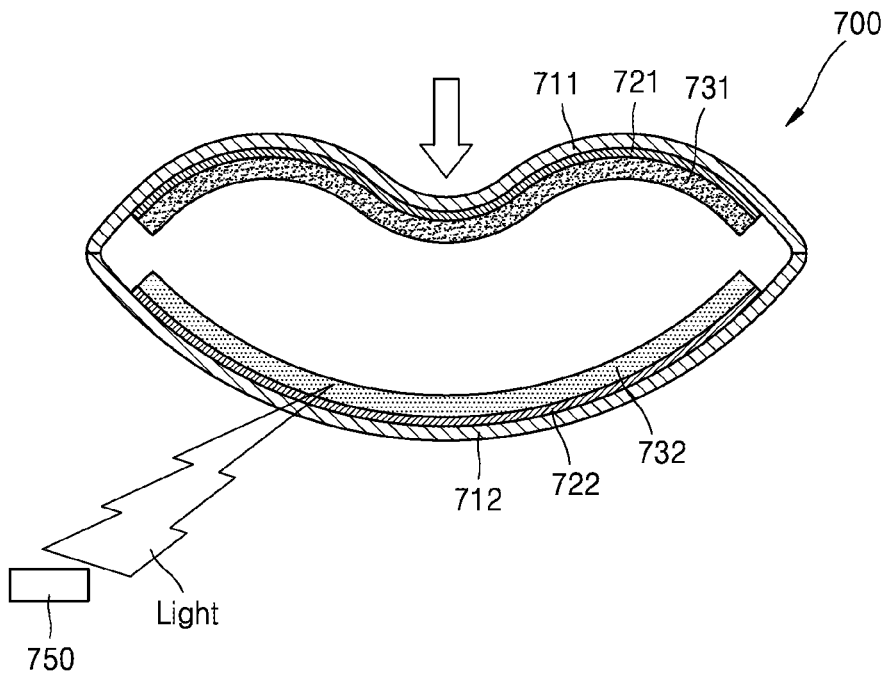
Figure 9C:
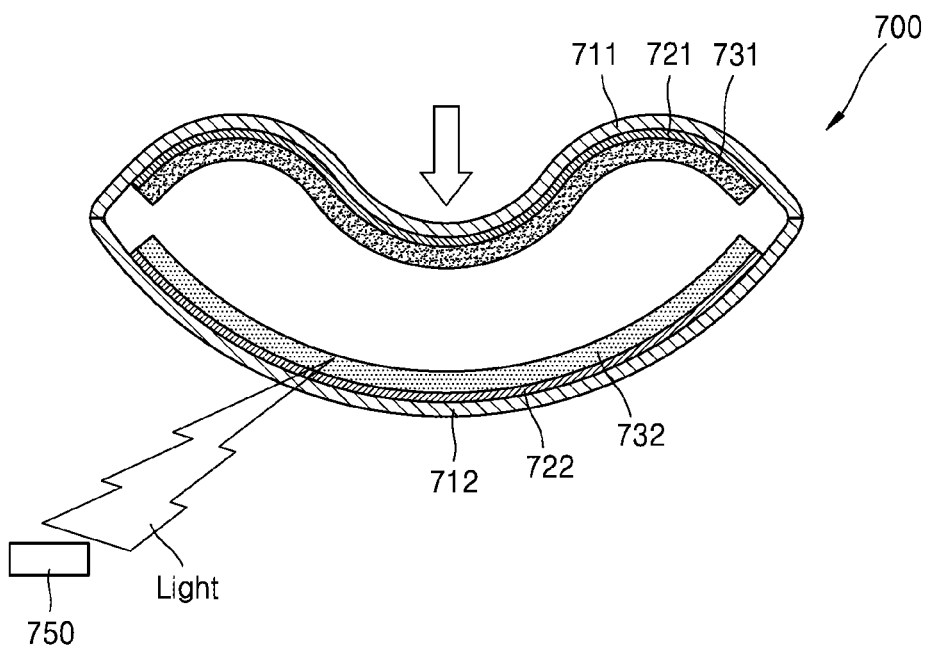

Referring to FIG. 9B, if a pressing force is applied to the first substrate 711, at least a part of the first substrate 711 being configured to be an upper substrate moves toward the second electrification layer 732 and starts to be transformed. Referring to FIG. 9C, if the first substrate 711 is continuously pressed, the first electrification layer 731 moves closer to the second electrification layer 732.

Figure 9D:
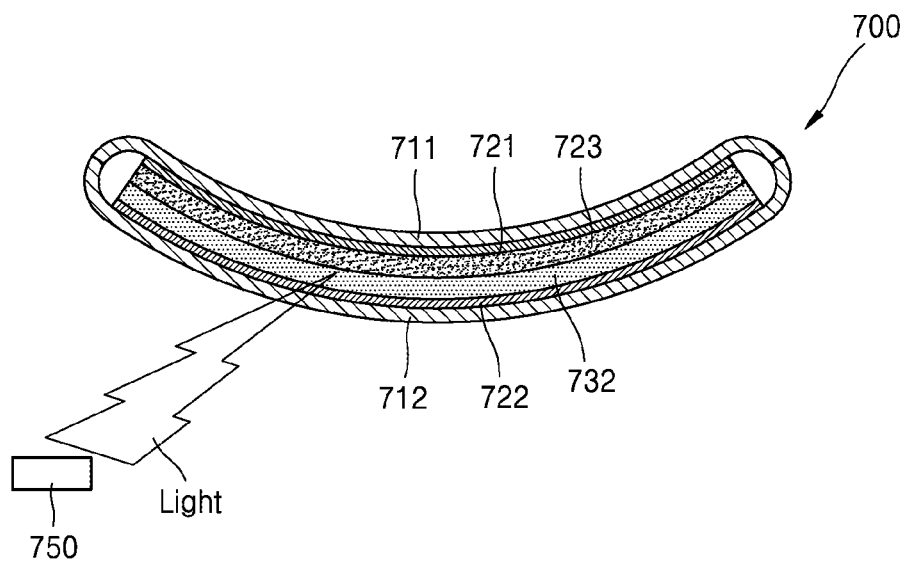
Figure 9E:
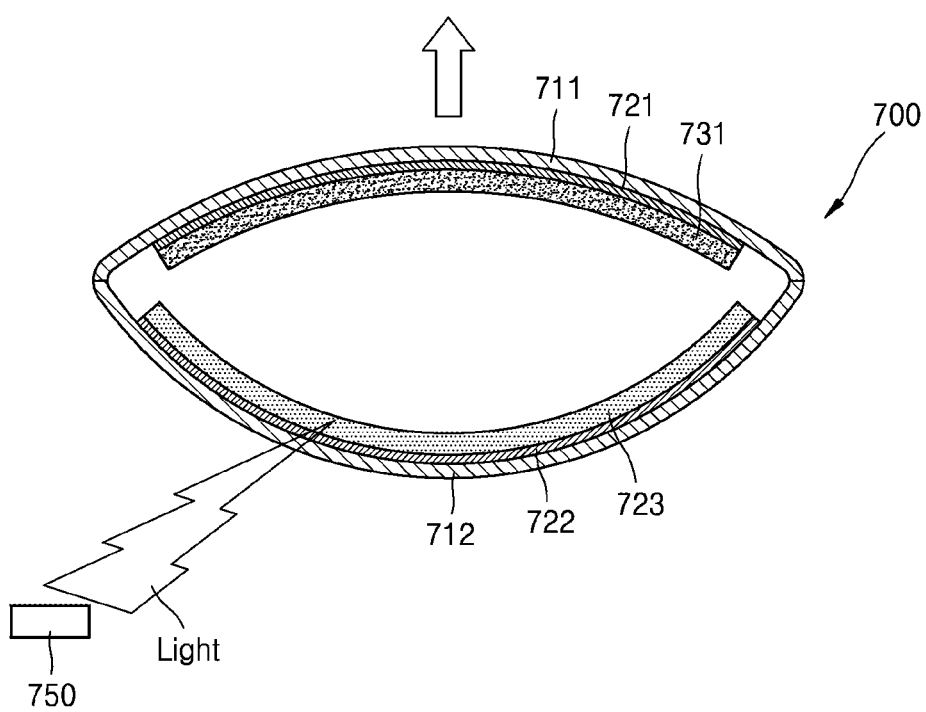

Then, referring to FIG. 9D, if the first substrate 711 is further pressed, the first electrification layer 731 contacts the second electrification layer 732. Thereafter, referring to FIG. 9E, if the force applied to the first substrate 711 is released, the first electrification layer 731 starts to be spaced apart from the second electrification layer 732. If the force is continuously released, the first substrate 711 returns to the initial state thereof as illustrated in FIG. 9A.

A detailed description of an electrical energy generating mechanism due to the above-described operation of the triboelectric generator 700 is given above in relation to the triboelectric generator 100 illustrated in FIG. 1, and thus is omitted herein. As described above, by configuring the triboelectric generator 700 to have flexibility, electrical energy may be efficiently obtained.

Figure 10:
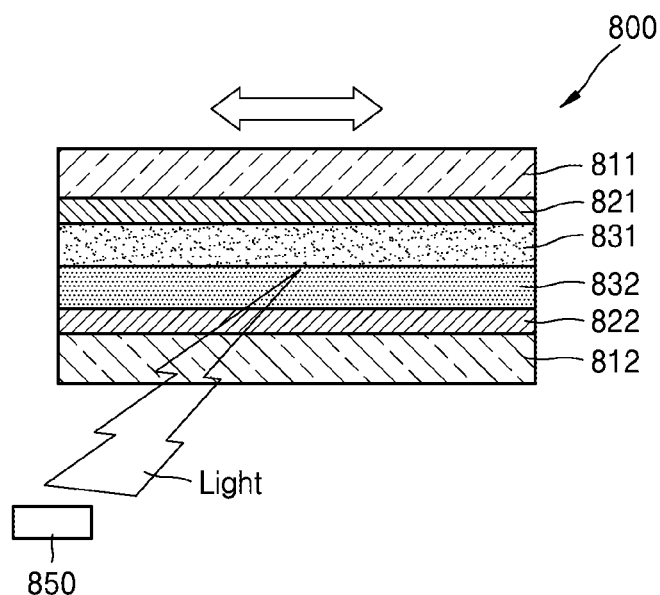
FIG. 10 is a cross-sectional view of a triboelectric generator according to another example embodiment.

FIG. 10 is a cross-sectional view of a triboelectric generator 800 according to another example embodiment. FIG. 10 illustrates a sliding-contact-mode triboelectric generator for generating electrical energy by electrifying two electrification objects due to contact therebetween based on sliding.

Referring to FIG. 10, the triboelectric generator 800 includes first and second electrodes 821 and 822 spaced apart from each other, a first electrification layer 831 provided on a surface of the first electrode 821, a second electrification layer 832 provided on a surface of the second electrode 822, and a light source 850 provided to irradiate light of a desired, or alternatively predetermined wavelength onto the second electrification layer 832.

The first and second electrodes 821 and 822 may be provided on first and second substrates 811 and 812, respectively. In FIG. 10, the first substrate 811 may be an upper substrate, and the second substrate 812 may be a lower substrate. The first and second substrates 811 and 812 may include a hard material or a flexible material.

The first electrode 821 is provided on a bottom surface of the first substrate 811, and the second electrode 822 is provided on a top surface of the second substrate 812. The first and second electrodes 821 and 822 may include a material having a good electrical conductivity. For example, the first and second electrodes 821 and 822 may include at least one material selected from graphene, carbon CNT, ITO, metal, and conductive polymer. Herein, the metal may include at least one selected from, for example, Ag, Al, Cu, Au, Ni, Cr, and Pt, but is not limited thereto. Each of, or at least one of, the first and second electrodes 821 and 822 may have a monolayer structure or a multilayer structure.

The light source 850 provided to irradiate the light of the desired, or alternatively predetermined wavelength is located below the second substrate 812. In this case, the second substrate 812 and the second electrode 822 may include transparent materials. Accordingly, the light of the desired, or alternatively predetermined wavelength emitted from the light source 850 may be irradiated onto the second electrification layer 832 through the second substrate 812 and the second electrode 822. The light source 850 may be provided at various locations, and the first substrate 811 and the first electrode 821 may include transparent materials depending on the location of the light source 850.

The first electrification layer 831 is provided on a bottom surface of the first electrode 821 facing the second electrode 822. The first electrification layer 831 may include a dielectric material configured to be electrified with charges of a desired, or alternatively predetermined polarity due to contact with the second electrification layer 832, and having a lower electrical conductivity compared to the second electrification layer 832.

The first electrification layer 831 may be electrified with positive charges due to contact with the second electrification layer 832. In this case, the first electrification layer 831 may include, for example, polyformaldehyde, ethylcellulose, polyamide, melamine formol, wool, silk, mica, or nylon. However, the first electrification layer 831 is not limited thereto. Alternatively, the first electrification layer 831 may be electrified with negative charges due to contact with the second electrification layer 832. In this case, the first electrification layer 831 may include, for example, polytetrafluoroethylene (Teflon), polydimethylsiloxane (PDMS), polyvinyl chloride (PVC), polyimide (Kapton), polypropylene (PP), polyethylene (PE), or polystyrene (PS). However, the first electrification layer 831 is not limited thereto.

The second electrification layer 832 is provided on a top surface of the second electrode 822 facing the first electrode 821. The second electrification layer 832 may be electrified with charges of an opposite polarity compared to the first electrification layer 831 due to contact with the first electrification layer 831. Specifically, when the first electrification layer 831 is electrified with positive charges due to contact with the second electrification layer 832, the second electrification layer 832 may be electrified with negative charges. Alternatively, when the first electrification layer 831 is electrified with negative charges due to contact with the second electrification layer 832, the second electrification layer 832 may be electrified with positive charges.

The second electrification layer 832 may include a metallic material having a higher electrical conductivity compared to the first electrification layer 831 and configured to generate surface plasmon resonance due to the light of the desired, or alternatively predetermined wavelength emitted from the light source 850. The metallic material may include a material configured to readily emit electrons due to an external stimulus and having a negative dielectric constant. For example, the metallic material may include at least one selected from Au, Ag, Cu, Al, and steel. However, the second electrification layer 832 is not limited thereto. The second electrification layer 832 may have, for example, the structure illustrated in FIG. 2, 5A, 5B, or 5C. At least one of the first and second electrification layers 831 and 832 may be doped with a p-type dopant or an n-type dopant to control electrification characteristics on the surface thereof.

The triboelectric generator 800 may have a physical structure in which the first and second electrification layers 831 and 832 are maintained in a contact state when an external force is not applied thereto. Alternatively, the triboelectric generator 800 may have a physical structure in which the first and second electrification layers 831 and 832 are maintained in a non-contact state when an external force is not applied thereto. In the triboelectric generator 800 according to the example embodiment, since the first electrification layer 831 relatively slides on the second electrification layer 832, a contact area between the first and second electrification layers 831 and 832 may vary and thus electrical energy may be generated.

The light source 850 irradiates the light of the desired, or alternatively predetermined wavelength configured to generate surface plasmon resonance, onto the surface of the metallic material of the second electrification layer 832. FIG. 10 illustrates a case in which the light source 850 is provided below the second substrate 812 being configured to be a lower substrate. In this case, the second substrate 812 and the second electrode 822 may include transparent materials to allow the light emitted from the light source 850, to reach the second electrification layer 832. The location of the light source 850 may be variously changed, and the first substrate 811 and the first electrode 821 may include transparent materials depending on the location of the light source 850. A surface plasmon resonance effect generated due to the light emitted from the light source 850 and irradiated onto the metallic material of the second electrification layer 832 may be controlled based on, for example, the material, size, shape, or density of the metallic material included in the second electrification layer 832, or the wavelength, intensity, or incidence angle of the light irradiated onto the metallic material. As described above, since the second electrification layer 832 includes the metallic material configured to generate surface plasmon resonance due to the light of the desired, or alternatively predetermined wavelength, output energy of the triboelectric generator 800 may be increased.

FIGS. 11A to 11D are cross-sectional views for describing an electrical energy generating mechanism of the triboelectric generator 800 illustrated in FIG. 10. The following description assumes that the first electrification layer 831 is electrified with positive charges and the second electrification layer 832 is electrified with negative charges when the first and second electrification layers 831 and 832 contact each other.

Figure 11A:
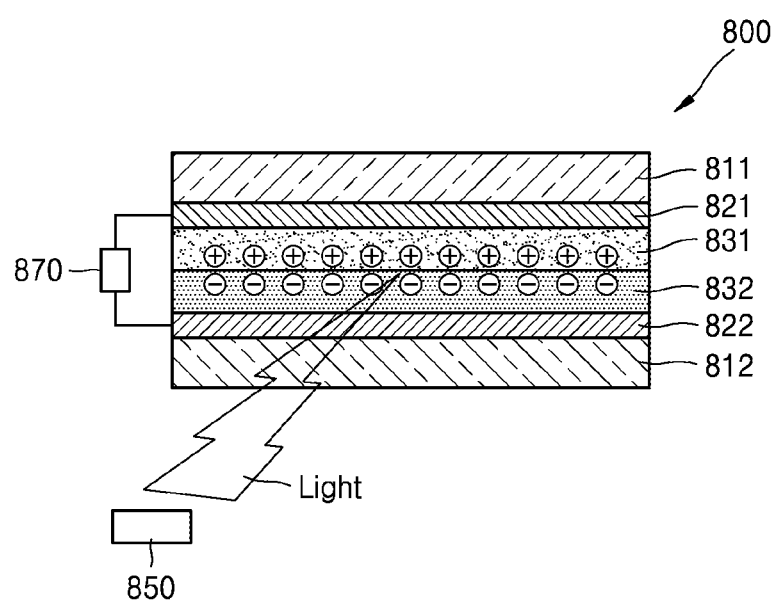
FIGS. 11A to 11D are cross-sectional views for describing an electrical energy generating mechanism of the triboelectric generator illustrated in FIG. 10.

FIG. 11A illustrates an initial state of the triboelectric generator 800. In FIG. 11A, reference numeral 870 denotes a load for detecting the flow of electrons between the first and second electrodes 821 and 822. Referring to FIG. 11A, when the light of the desired, or alternatively predetermined wavelength emitted from the light source 850 is irradiated onto the second electrification layer 832, hot carriers are generated on the surface of the metallic material of the second electrification layer 832 due to surface plasmon resonance. Herein, the first and second electrification layers 831 and 832 are maintained in a contact state. Due to contact between the first and second electrification layers 831 and 832, the first electrification layer 831 may be electrified with positive charges, and the second electrification layer 832 may be electrified negative charges. Since hot carriers generated due to surface plasmon resonance move from the metallic material of the second electrification layer 832 to the first electrification layer 831, contact surfaces of the first and second electrification layers 831 and 832 may be electrified with more charges.

Figure 11B:
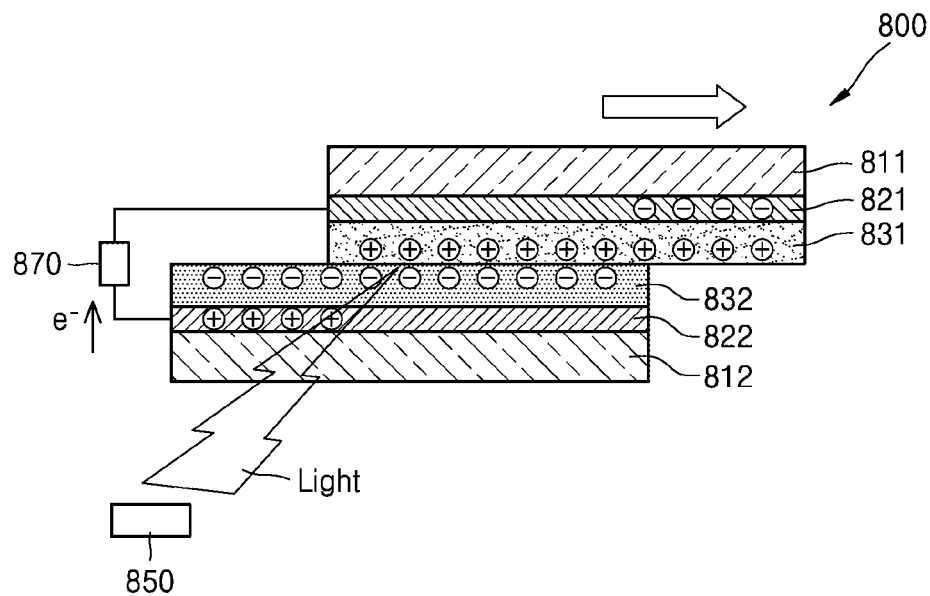

FIG. 11B illustrates a state in which the first electrification layer 831 slides in a first direction. Referring to FIG. 11B, in the contact state of the first and second electrification layers 831 and 832, if the first electrification layer 831 slides in the first direction away from the second electrification layer 832 (e.g., a right direction), a contact area of the first and second electrification layers 831 and 832 is gradually reduced. As such, negative charges are induced to the first electrode 821 and positive charges are induced to the second electrode 822. To this end, electrons (e⁻) move from the second electrode 822 to the first electrode 821, and the flow of electrons makes a current flow through the load 870.

Figure 11C:
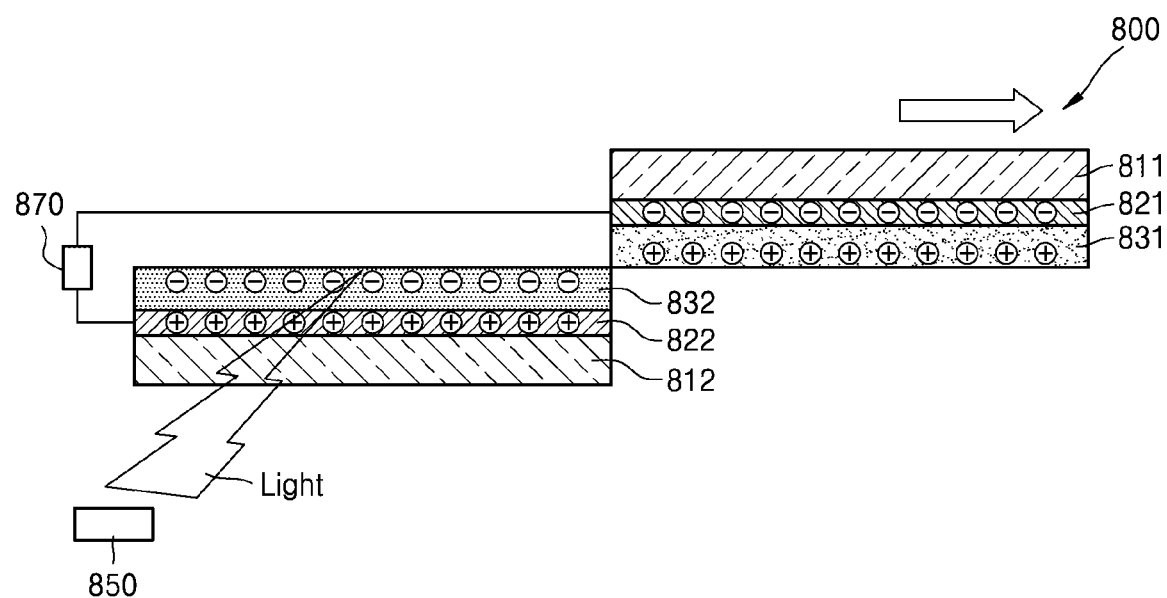

FIG. 11C illustrates a state in which the first electrification layer 831 continuously slides in the first direction and thus the first and second electrification layers 831 and 832 do not contact each other. Referring to FIG. 11C, if the first electrification layer 831 continuously slides in the first direction, the first and second electrification layers 831 and 832 may not contact each other. In this case, parts of the first and second electrification layers 831 and 832 may contact each other.

Figure 11D:
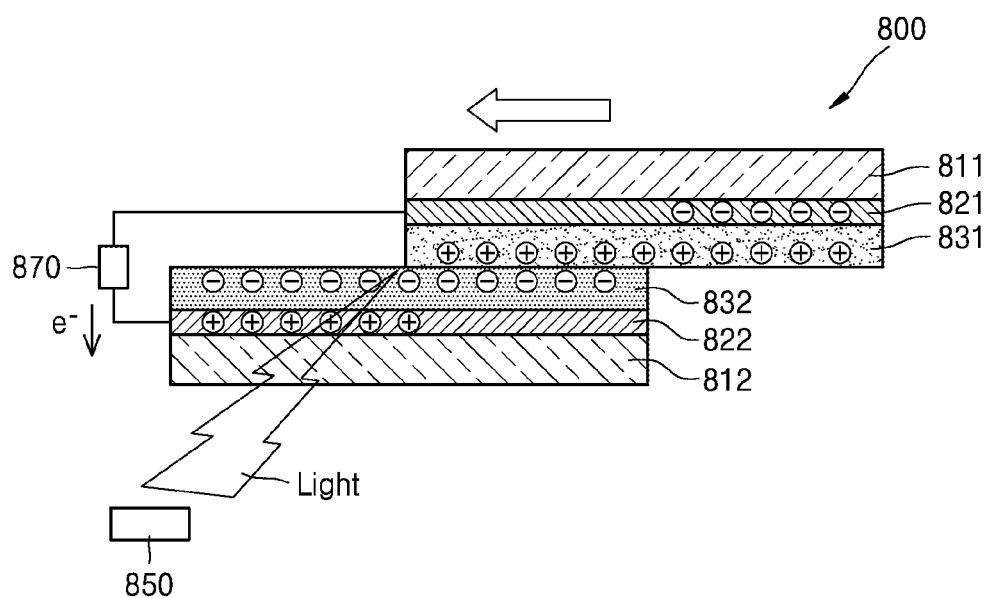

FIG. 11D illustrates a state in which the first electrification layer 831 slides in a second direction. Referring to FIG. 11D, in the state illustrated in FIG. 11C, if the first electrification layer 831 slides in the second direction opposite to the first direction (e.g., a left direction), the contact area of the first and second electrification layers 831 and 832 is gradually increased. As such, positive charges are induced to the first electrode 821 and negative charges are induced to the second electrode 822. To this end, electrons (e⁻) move from the first electrode 821 to the second electrode 822, and the flow of electrons makes a current flow through the load 870.

As described above, since the second electrification layer 832 includes the metallic material configured to generate surface plasmon resonance due to the light of the desired, or alternatively predetermined wavelength emitted from the light source 850, output energy of the triboelectric generator 800 may be increased. Although the second electrode 822 and the second electrification layer 832 are individually provided in the above description, the second electrode 822 and the second electrification layer 832 may be integrated with each other.

Figure 12:
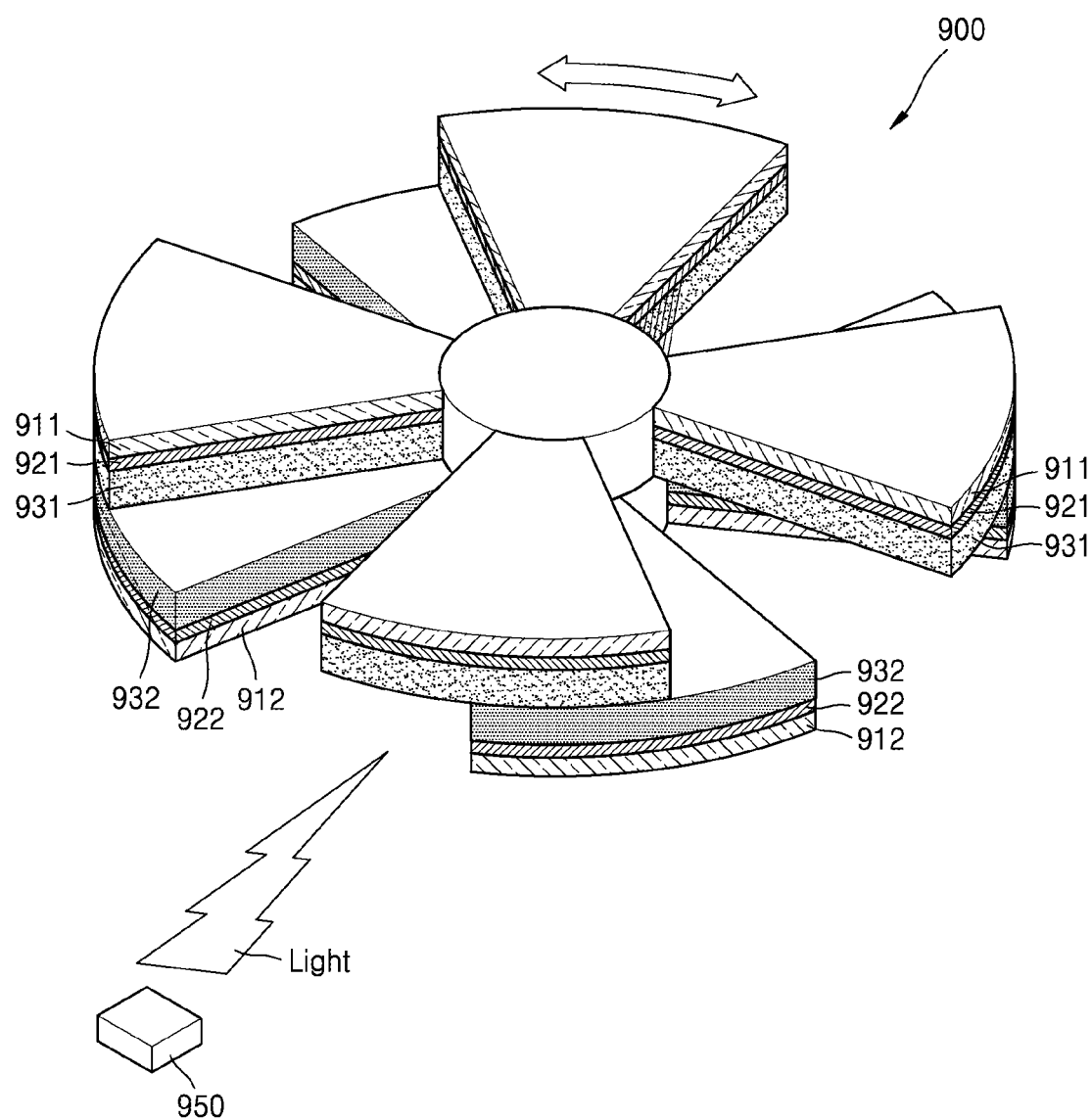
FIG. 12 is a perspective view of a triboelectric generator according to another example embodiment.

FIG. 12 is a perspective view of a triboelectric generator 900 according to another example embodiment. FIG. 12 illustrates a rotating-contact-mode triboelectric generator for generating electrical energy by electrifying two electrification objects due to contact therebetween based on rotating.

Referring to FIG. 12, the triboelectric generator 900 includes first and second substrates 911 and 912, first and second electrodes 921 and 922 provided on the first and second substrates 911 and 912, respectively, first and second electrification layers 931 and 932 provided on the first and second electrodes 921 and 922, respectively, and a light source 950 provided to irradiate light of a desired, or alternatively predetermined wavelength onto the second electrification layer 932.

The first substrate 911 may be an upper substrate, and the second substrate 912 may be a lower substrate. The first electrode 921 is provided on a bottom surface of the first substrate 911, and the second electrode 922 is provided on a top surface of the second substrate 912. The first and second electrodes 921 and 922 may include a material having a good electrical conductivity.

The first electrification layer 931 is provided on a bottom surface of the first electrode 921, and the second electrification layer 932 is provided on a top surface of the second electrode 922. The first electrification layer 931 may include a dielectric material configured to be electrified with positive charges or negative charges due to contact with the second electrification layer 932, and having a lower electrical conductivity compared to the second electrification layer 932.

The second electrification layer 932 may be electrified with charges of an opposite polarity compared to the first electrification layer 931 due to contact with the first electrification layer 931. The second electrification layer 932 may include a metallic material having a higher electrical conductivity compared to the first electrification layer 931 and configured to generate surface plasmon resonance due to the light of the desired, or alternatively predetermined wavelength emitted from the light source 950. The metallic material may include a material configured to readily emit electrons due to an external stimulus and having a negative dielectric constant. For example, the metallic material may include at least one selected from Au, Ag, Cu, Al, and steel. However, the second electrification layer 932 is not limited thereto. The second electrification layer 932 may have, for example, the structure illustrated in FIG. 2, 5A, 5B, or 5C. At least one of the first and second electrification layers 931 and 932 may be doped with a p-type dopant or an n-type dopant to control electrification characteristics on the surface thereof.

The light source 950 provided to generate surface plasmon resonance by irradiating the light of the desired, or alternatively predetermined wavelength onto the second electrification layer 932 is located near the second electrification layer 932. The light source 950 may be provided at various locations to irradiate the light of the desired, or alternatively predetermined wavelength onto the second electrification layer 932.

In the example embodiment, the first substrate 911, the first electrode 921, and the first electrification layer 931, which are stacked, for example sequentially stacked on one another, may configure at least one first wing, and the second substrate 912, the second electrode 922, and the second electrification layer 932, which are stacked, for example sequentially stacked on one another, may configure at least one second wing. FIG. 12 illustrates a case in which four first wings and four second wings are provided. In this configuration, if the first wings relatively rotate with respect to the second wings, the first electrification layer 931 may rotate and slide on the second electrification layer 932. As such, a contact area between the first and second electrification layers 931 and 932 may vary and thus electrical energy may be generated.

Figure 13:
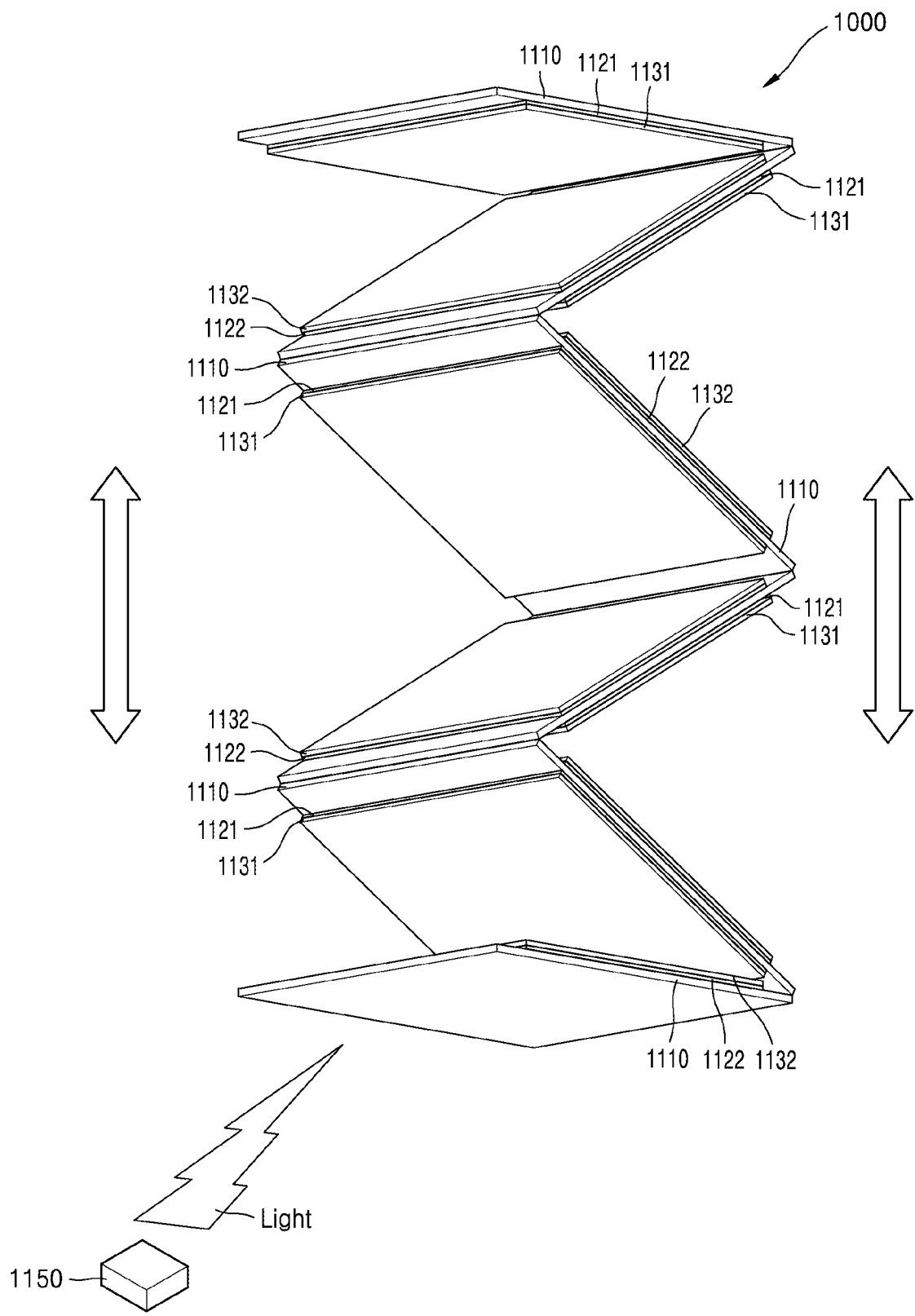
FIG. 13 is a perspective view of a triboelectric generator according to another example embodiment.

FIG. 13 is a perspective view of a triboelectric generator 1000 according to another example embodiment.

Referring to FIG. 13, a plurality of substrates 1110 are connected to each other and provided to be foldable at connected parts thereof. First electrodes 1121 and first electrification layers 1131 may be stacked, for example sequentially stacked on first surfaces of the substrates 1110 (e.g., bottom surfaces of the substrates 1110), and second electrodes 1122 and second electrification layers 1132 may be sequentially stacked on second surfaces of the substrates 1110 (e.g., top surfaces of the substrates 1110).

The first and second electrodes 1121 and 1122 may include a material having a good electrical conductivity. For example, the first and second electrodes 1121 and 1122 may include at least one material selected from graphene, CNT, ITO, metal, and conductive polymer. Herein, the metal may include at least one selected from, for example, Ag, Al, Cu, Au, Ni, Cr, and Pt, but is not limited thereto. Each of, or at least one of, the first and second electrodes 1121 and 1122 may have a monolayer structure or a multilayer structure.

The first electrification layers 1131 may include a dielectric material configured to be electrified with positive charges or negative charges due to contact with the second electrification layers 1132, and having a lower electrical conductivity compared to the second electrification layers 1132. The second electrification layers 1132 may be electrified with charges of an opposite polarity compared to the first electrification layers 1131 due to contact with the first electrification layers 1131. The second electrification layers 1132 may include a metallic material having a higher electrical conductivity compared to the first electrification layers 1131 and configured to generate surface plasmon resonance due to light of a desired, or alternatively predetermined wavelength emitted from a light source 1150. The metallic material may include a material configured to readily emit electrons due to an external stimulus and having a negative dielectric constant. The second electrification layers 1132 may have, for example, the structure illustrated in FIG. 2, 5A, 5B, or 5C. At least one of the first and second electrification layers 1131 and 1132 may be doped with a p-type dopant or an n-type dopant to control electrification characteristics on the surface thereof.

The light source 1150 provided to generate surface plasmon resonance by irradiating the light of the desired, or alternatively predetermined wavelength onto the second electrification layers 1132 is located near the second electrification layers 1132. Herein, the location and number of the light sources 1150 may be variously changed to irradiate the light of the desired, or alternatively predetermined wavelength onto the second electrification layers 1132. In the triboelectric generator 1000 according to the example embodiment, the first and second electrification layers 1131 and 1132 may contact or be spaced apart from each other by folding or unfolding the plurality of substrates 1110, and thus electrical energy may be generated.

As described above, in triboelectric generators according to embodiments, since a second electrification layer includes a metallic material configured to generate surface plasmon resonance due to light of a desired, or alternatively predetermined wavelength emitted from a light source, output energy of the triboelectric generators may be increased.

It should be understood that embodiments described herein should be considered in a descriptive sense only and not for purposes of limitation. Descriptions of features or example embodiments should typically be considered as available for other similar or same features in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A triboelectric generator comprising:
a first electrode and a second electrode spaced apart from each other;
a first electrification layer on a surface of the first electrode facing the second electrode, and including a dielectric material;
a second electrification layer on a surface of the second electrode facing the first electrode, electrified with charges of an opposite polarity with respect to the first electrification layer due to contact with the first electrification layer, the second electrification layer including a metallic material configured to generate surface plasmon resonance due to light of a desired wavelength; and
a light source configured to irradiate the light onto the second electrification layer.

2. The triboelectric generator of claim 1, wherein the first electrification layer and the second electrification layer are in contact with each other due to pressing, sliding, or rotating.

3. The triboelectric generator of claim 1, wherein the first electrode and the second electrode comprise at least one of graphene, carbon nanotubes (CNT), indium tin oxide (ITO), metal, and conductive polymer.

4. The triboelectric generator of claim 1, wherein at least one of the first electrode and the second electrode comprises a material configured to transmit the light.

5. The triboelectric generator of claim 1, wherein the first electrode and the second electrode are on first and second substrates, respectively.

6. The triboelectric generator of claim 5, wherein the first substrate and the second substrate comprise a material configured to be elastically deformed when subjected to an external force.

7. The triboelectric generator of claim 6, wherein
the first substrate has a convex shape in a first direction, and
wherein the second substrate has a convex shape in a second direction opposite to the first direction.

8. The triboelectric generator of claim 1, wherein the first electrification layer comprises a material configured to be electrified with positive charges due to contact with the second electrification layer.

9. The triboelectric generator of claim 1, wherein the first electrification layer comprises a material configured to be electrified with negative charges due to contact with the second electrification layer.

10. The triboelectric generator of claim 1, wherein
the second electrification layer comprises a plurality of metal particles configured to generate the surface plasmon resonance,
the second electrification layer further comprises a plurality of first dielectric bodies surrounding the metal particles, and
some of the plurality of first dielectric bodies insulating some of the plurality of metal particles from the second electrode.

11. The triboelectric generator of claim 10, wherein
some of the metal particles in contact with the first electrification layer expose surfaces thereof to an external environment.

12. The triboelectric generator of claim 11, wherein the second electrification layer further comprises a second dielectric body filling spaces between the first dielectric bodies.

13. The triboelectric generator of claim 1, wherein the second electrification layer comprises a metal having a surface roughness configured to generate the surface plasmon resonance.

14. The triboelectric generator of claim 1, wherein at least one of the first electrification layer and the second electrification layer is doped with a dopant.

15. The triboelectric generator of claim 1, wherein the second electrode and the second electrification layer are integrated with each other.

16. The triboelectric generator of claim 1, further comprising:
an elastic supporting member between the first electrification layer and the second electrification layer.

17. The triboelectric generator of claim 1, wherein at least one of the first electrification layer and the second electrification layer comprises a wing shape, and
wherein the first electrification layer and the second electrification layer are in contact with each other via a rotation of at least one of the first electrification layer and the second electrification layer.

18. A triboelectric generator comprising:
a plurality of substrates connected to each other and being foldable at connected parts thereof;
first electrodes and second electrodes on first surfaces of the substrates and second surfaces of the substrates, respectively;
first electrification layers on the first electrodes and including a dielectric material;
second electrification layers on the second electrodes, the second electrification layers being electrified with charges of an opposite polarity with respect to the first electrification layers due to contact with the first electrification layers, and including a metallic material configured to generate surface plasmon resonance due to light of a desired wavelength; and
a light source configured to irradiate the light, onto the second electrification layers.

19. The triboelectric generator of claim 18, wherein the second electrification layers comprise a plurality of metal particles configured to generate the surface plasmon resonance.

20. The triboelectric generator of claim 18, wherein the second electrification layers comprise a metal having a surface roughness configured to generate the surface plasmon resonance.

* * * * *